US011475510B2

(12) United States Patent
Drutsa

(10) Patent No.: US 11,475,510 B2
(45) Date of Patent: Oct. 18, 2022

(54) METHOD AND SERVER FOR GENERATING MODIFIABLE PORTION OF DIGITAL DOCUMENT

(71) Applicant: YANDEX EUROPE AG, Lucerne (CH)

(72) Inventor: Alexey Valerevich Drutsa, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 165 days.

(21) Appl. No.: 16/909,540

(22) Filed: Jun. 23, 2020

(65) Prior Publication Data

US 2021/0158436 A1 May 27, 2021

(30) Foreign Application Priority Data

Nov. 26, 2019 (RU) ................................ 2019138208

(51) Int. Cl.
| | | |
|---|---|---|
| *G06F 16/93* | (2019.01) | |
| *G06F 40/166* | (2020.01) | |
| *G06Q 30/08* | (2012.01) | |
| *G06Q 20/40* | (2012.01) | |
| *G06Q 10/10* | (2012.01) | |

(52) U.S. Cl.
CPC ............ *G06Q 30/08* (2013.01); *G06F 16/93* (2019.01); *G06F 40/166* (2020.01); *G06Q 10/10* (2013.01); *G06Q 20/405* (2013.01)

(58) Field of Classification Search
CPC ...... G06Q 30/08; G06Q 10/10; G06Q 20/405; G06F 16/93; G06F 40/166
See application file for complete search history.

(56) References Cited

U.S. PATENT DOCUMENTS

| | | | | |
|---|---|---|---|---|
| 10,825,047 | B2* | 11/2020 | Vorozhtsov | ....... G06F 16/24578 |
| 2006/0293994 | A1* | 12/2006 | Stuart | ................ G06Q 30/0601 |
| | | | | 705/37 |
| 2007/0162379 | A1* | 7/2007 | Skinner | .............. G06Q 30/0277 |
| | | | | 705/37 |
| 2008/0275863 | A1* | 11/2008 | Dominowska | ......... G06Q 30/02 |
| | | | | 707/999.005 |
| 2009/0240600 | A1* | 9/2009 | Soulanille | .............. G06Q 30/08 |
| | | | | 707/999.005 |

(Continued)

*Primary Examiner* — Scott T Baderman
*Assistant Examiner* — Mario M Velez-Lopez
(74) *Attorney, Agent, or Firm* — BCF LLP

(57) ABSTRACT

Methods and servers for generating a modifiable portion of a digital document which has message slots for placement of digital messages are disclosed. The generating being performed during a first selection-round of a plurality of selection-rounds. The method includes, during the first selection-round: providing access to a first combination of originators that are to bid for message slots during the first selection-round. The first combination is selected by limiting (i) the number of originators that are to bid for message slots, and (ii) which combination of originators are to bid for message slots. The method includes acquiring bidding data for the first selection-round. The method includes triggering placement of digital messages in the message slots of the modifiable portion based on the bidding data, and updating data about the first combination of originators for performing a subsequent selection-round.

17 Claims, 10 Drawing Sheets

(56) References Cited

U.S. PATENT DOCUMENTS

| | | | |
|---|---|---|---|
| 2012/0246021 A1* | 9/2012 | Hamor | G06Q 30/08 705/26.3 |
| 2012/0323674 A1* | 12/2012 | Simmons | G06Q 30/0249 705/14.41 |
| 2014/0046777 A1* | 2/2014 | Markey | G06Q 30/02 705/14.66 |
| 2014/0052719 A1* | 2/2014 | Ghatare | G06F 16/248 707/731 |
| 2015/0379435 A1* | 12/2015 | Johnson | G06Q 30/0277 705/5 |
| 2017/0103451 A1 | 4/2017 | Alipov et al. | |
| 2020/0219145 A1* | 7/2020 | Kalampoukas | G06Q 30/0275 |

\* cited by examiner

METHOD AND SERVER FOR GENERATING MODIFIABLE PORTION OF DIGITAL DOCUMENT

CROSS-REFERENCE

The present application claims priority to Russian Patent Application No. 2019138208, entitled "Method and Server for Generating Modifiable Portion of Digital Document", filed Nov. 26, 2019, the entirety of which is incorporated herein by reference.

FIELD

The present technology relates to generation of digital documents in general and, specifically, to a method and server for generating a modifiable portion of a digital document.

BACKGROUND

Various global or local communications networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The user can access the information available on the Internet by several means. The given user can access a particular resource directly, either by typing an address of the resource (typically an URL or Universal Resource Locator) or by clicking a link in an e-mail or in another web resource. This is particularly useful when the user knows what the resource she or he is interested in.

Alternatively, the given user may conduct a search using a search engine to locate a resource of interest. The latter is particularly suitable in those circumstances, where the given user knows a topic of interest, but does not know the exact address of the resource she is interested in. There are numerous search engines available to the user. Some of them are considered to be general purpose search engines (such as Yandex™, Google™, Yahoo™ and the like). Others are considered to be vertical search engines—i.e. search engines dedicated to a particular topic of search—such as Momondo™ search engine dedicated to searching flights. Irrespective of which search engine is used, the search engine is generally configured to receive a search query from a user, to perform a search and to return a ranked search engine results page (SERP) to the user.

When accessing the particular web site or conducting the search, the user can be presented with generic content or personalized content. The generic content is the content that would be shown to any user accessing the particular resource without taking into account user-specific parameters, such as user interests, user interaction history and the like. Personalized content is a type of content that is specifically targeted for the given user, based on predicted or known user interest parameters. Thus, the personalized content can be thought of as "targeted content".

For example, the search result ranking on any given SERP can be generic (using a generic search engine result ranking algorithm) or personalized for the given user (i.e. ranked at least in part based on the information known about the given user, such as past queries, past search result interactions and the like). By the same token, a given web resource can provide generic content and personalized content to the user. Personalized content can take many forms, such as a targeted message incorporated into the content of the web site, the targeted message having been selected for the given user as a relevant message based on certain information known about the given user. The targeted message can be provided by a provider of the generic content of the given web resource or, alternatively, it can come from a third-party source and inserted into the generic content otherwise available on the web resource.

Continuing with the example of the SERP, some search results can be generic and ranked using the generic search engine result ranking algorithm, while other results can be targeted electronic messages. These can take form of electronic ad banners or search results associated with "special placement" within the SERP. This special placement may or may not be aligned with the rank of these specially placed search results, if their rank was determined using the generic search engine result ranking algorithm.

Generally, such special placement is selected to drive user attention to the specially placed targeted electronic message and, therefore, to cause the user to execute a pre-determined desired action. The pre-determined desired action can be user interaction with the targeted electronic message, the user visiting a network resource associated with a source of the targeted electronic message, the user executing a pre-determined action associated with the network resource, and the like.

As such, the special placement for the targeted electronic message is typically associated with a special arrangement, such as a source of such specially-places targeted electronic message having to pay for such placement to either a provider of the search engine or a provider of an electronic ads platform.

SUMMARY

Developers of the present technology have appreciated certain technical drawbacks associated with existing algorithms for placement of digital messages into strategic portions of digital documents.

It is an object of the present technology to ameliorate at least some of the inconveniences present in the prior art.

In a first broad aspect of the present technology, there is provided a computer-implemented method of generating a modifiable portion of a digital document. The modifiable portion has message slots for placement of digital messages. The digital messages are provided by a plurality of originators. The generating is performed during a first selection-round of a plurality of selection-rounds, each selection-round is associated with a respective number of message slots that are available on the modifiable portion to be bid-for by originators having access to the respective selection-round. The method is executable by a server. The method comprises, during the first selection-round from the plurality of selection-rounds, providing, by the server, access to the first selection-round to a first combination of originators. The first combination includes a number of originators that is equal to the number of message slots available for the first selection-round. The method thereby comprises limiting, by the server, the number of originators from the plurality of originators that are to bid for message slots during the first selection-round. The method comprises, during the first selection-round from the plurality of selection-rounds, acquiring, by the server, first bidding data for the first selection-round. The first bidding data being associated with the first combination of originators that bid for message slots during the first selection-round. The method comprises, during the first selection-round from the plurality of selection-rounds, triggering, by the server, placement of digital messages of at least some of the first combination of originators in the message slots of the modifiable portion based on the first bidding data, thereby generating, by the server, the modifiable portion of the digital document. The method comprises, during a subsequent selection-round from the plurality of selection-rounds, providing, by the server, access to the subsequent selection-round to a second combination of originators. The second combination is different from the first combination. The second combination includes a number of originators that is equal to the number of message slots available for the subsequent selection-round, The method thereby comprises limiting, by the server, (i) the number of originators from the plurality of originators that are to bid for message slots during the subsequent selection-round, and (ii) which combination of originators are to bid for message slots during the subsequent selection-round. The method comprises, during the subsequent selection-round from the plurality of selection-rounds, acquiring, by the server, second bidding data for the subsequent selection-round. The second bidding data is associated with the second combination of originators that bid for message slots during the subsequent selection-round. The method comprises, during the subsequent selection-round from the plurality of selection-rounds, triggering, by the server, placement of digital messages of at least some of the second combination of originators in the message slots of the modifiable portion based on the second bidding data, thereby generating, by the server, an other modifiable portion of an other digital document.

In some embodiments of the method, the other digital document is the digital document.

In some embodiments of the method, any one of the digital document and the other digital document is a Search Engine Result Page (SERP) to be generated by the server.

In some embodiments of the method, the digital document is an on-line resource.

In some embodiments of the method, the method comprises, during any given one of the plurality of selection-rounds, identifying, by the server, a given combination of originators that is to be provided with access to the any given one of the plurality of selection-rounds. The identifying comprises applying, by the server, combination-selection rules including at least: a limitation rule for limiting a total number of originators in the given combination, and a cycling rule for providing access to different combinations of originators during different selection-rounds from the plurality of selection-rounds.

In some embodiments of the method, the acquiring the first bidding data comprises acquiring, by the server, a bidding price associated with a given originator from the first combination for a respective message slot on the digital document. The bidding price is indicative of an amount that the given originator proposes to pay for the respective message slot for placement of a respective digital message during the first selection-round. The acquiring the first bidding data comprises acquiring, by the server, a current reserve price associated with the given originator during the first selection-round. The current reserve price has been determined specifically for the given originator based on a latest estimation of a maximum amount that the given originator is ready to pay for the respective message slot for placement of the respective digital message during any one of the plurality of selection-rounds. The acquiring the first bidding data comprises comparing, by the server, the bidding price against the current reserve price. The first bidding data is indicative of whether the bidding price of the given originator matches the current reserve price of the given originator.

In some embodiments of the method, in response to the bidding price not matching the current reserve price, the method further comprises updating, by the server, the current reserve price of the given originator from the first combination of originators, thereby generating, by the server, an updated reserve price for the given originator.

In some embodiments of the method, the updating comprises determining, by the server, an adjusted boundary for an adjusted price interval based on (i) a boundary of a price interval and (ii) the first bidding data. The price interval is available to the server and includes the current reserve price. The updating thereby comprises determining an adjusted price interval based on the price interval and the first bidding data. The updating comprises determining, by the server, the updated reserve price for the given originator based on the adjusted price interval.

In some embodiments of the method, the adjusted boundary is one of (i) a lower adjusted boundary of the adjusted price interval and (ii) an upper adjusted boundary of the adjusted price interval.

In some embodiments of the method, when the current reserve price is above the bidding price, the adjusted upper boundary of the adjusted price interval is determined based on a difference between the current reserve price and a lower boundary of the price interval, such that adjustment of the upper boundary of the price interval is proportional to the difference.

In some embodiments of the method, the method further comprises storing, by the server, the updated reserve price in association with the given originator in a storage instead of the current reserve price of the given message originator during the first selection-round. The updated reserve price is to be used as the current reserve price of the given originator during a next selection-round to which the given originator is provided access.

In some embodiments of the method, the given originator is part of the first combination of originators and of the second combination of originators.

In some embodiments of the method, the acquiring the second bidding data comprises acquiring, by the server, an other bidding price associated with the given originator for a respective message slot on the other modifiable portion. The other bidding price is indicative of an amount that the given originator proposes to pay for the respective message slot for placement of a respective digital message during the sequential selection-round. The acquiring the second bidding data comprises acquiring, by the server, the current reserve price associated with the given originator during the sequential selection-round. The current reserve price is the updated reserve price associated with the given originator having been updated in response to the first selection-round. The acquiring the second bidding data comprises comparing, by the server, the other bidding price against the current reserve price. The second bidding data is indicative of whether the other bidding price of the given originator matches the current reserve price of the given message originator.

In some embodiments of the method, the method further comprises after the plurality of selection-rounds determining, by the server, which originator is associated with a lowest current reserve price amongst the plurality of originators. The originator associated with the lowest current reserve price is a low-yield originator. The method further comprises after the plurality of selection-rounds, excluding, by the server, the low-yield originator from all of a sequential plurality of selection-rounds.

In some embodiments of the method, the method further comprises, after the plurality of selection-rounds, determining, by the server, which originator is associated with a highest current reserve price amongst the plurality of originators. The originator associated with the highest current reserve price is a high-yield originator. The method further comprises, after the plurality of selection-rounds including, by the server, the high-yield originator in all of a sequential plurality of selection-rounds.

In some embodiments of the method, the method further comprises triggering, by the server, display of the digital document with the modifiable portion on an electronic device associated with a user.

In another broad aspect of the present technology, there is provided a computer-implemented method of generating a modifiable portion of a digital document. The modifiable portion has message slots for placement of digital messages. The digital messages is provided by a plurality of originators. The generating is performed during a given selection-round of a plurality of selection-rounds. Each selection-round is associated with a respective number of message slots that are available on the modifiable portion to be bid-for by originators having access to the respective selection-round, The method is executable by a server. The method comprises, during the given selection-round from the plurality of selection-rounds, providing, by the server, access to the given selection-round to a first combination of originators. The first combination includes a number of originators that is equal to the number of message slots available for the given selection-round. The method thereby comprises limiting, by the server, the number of originators from the plurality of originators that are to bid for message slots during the first selection-round. The first combination is different from a previous combination of originators. The pervious combination has been provided access to a previous selection-round from the plurality of selection-rounds. The method thereby comprises limiting, by the server, which combination of originators are to bid for message slots during the given selection-round. The first combination and the previous combination includes at least one common originator. The method comprises, during the given selection-round from the plurality of selection-rounds, acquiring, by the server, first bidding data for the first selection-round. The first bidding data is associated with the first combination of originators that bid for message slots during the first selection-round. The first bidding data including at least: (i) a bidding price of the at least one common originator from the first combination of originators, (ii) an individualized current reserve price for the at least one common originator from the first combination of originators. The bidding price is indicative of an amount that the at least one common originator proposes to pay for the respective message slot for placement of a respective digital message during the first selection-round. The individualized current reserve price has been determined specifically for the at least one common originator based on a latest estimation of a maximum amount that the at least one common originator is ready to pay for the respective message slot for placement of the respective digital message during any one of the plurality of selection-rounds. The individualized current reserve price has been adjusted for the at least one common originator in response to the previous selection-round.

In a third broad aspect of the present technology, there is provided a server for generating a modifiable portion of a digital document. The modifiable portion has message slots for placement of digital messages. The digital messages are provided by a plurality of originators.

The generating is performed during a first selection-round of a plurality of selection-rounds. Each selection-round is associated with a respective number of message slots that are available on the modifiable portion to be bid-for by originators having access to the respective selection-round. The server is configured to, during the first selection-round from the plurality of selection-rounds, provide access to the first selection-round to a first combination of originators.

The first combination includes a number of originators that is equal to the number of message slots available for the first selection-round. The server is thereby configured to limit the number of originators from the plurality of originators that are to bid for message slots during the first selection-round. The server is configured to, during the first selection-round from the plurality of selection-rounds, acquire first bidding data for the first selection-round. The first bidding data being associated with the first combination of originators that bid for message slots during the first selection-round. The server is configured to, during the first selection-round from the plurality of selection-rounds, trigger placement of digital messages of at least some of the first combination of originators in the message slots of the modifiable portion based on the first bidding data. The server is thereby configured to generate the modifiable portion of the digital document. The server is configured to, during a subsequent selection-round from the plurality of selection-rounds, provide access to the subsequent selection-round to a second combination of originators. The second combination is different from the first combination. The second combination includes a number of originators that is equal to the number of message slots available for the subsequent selection-round. The server is thereby configured to limit (i) the number of originators from the plurality of originators that are to bid for message slots during the subsequent selection-round, and (ii) which combination of originators are to bid for message slots during the subsequent selection-round. The server is configured to, during the subsequent selection-round from the plurality of selection-rounds, acquire second bidding data for the subsequent selection-round. The second bidding data is associated with the second combination of originators that bid for message slots during the subsequent selection-round. The server is configured to, during the subsequent selection-round from the plurality of selection-rounds, trigger placement of digital messages of at least some of the second combination of originators in the message slots of the modifiable portion based on the second bidding data. The server is thereby configured to generate an other modifiable portion of an other digital document.

In some embodiments of the server, the other digital document is the digital document.

In some embodiments of the server, any one of the digital document and the other digital document is a Search Engine Result Page (SERP) to be generated by the server.

In some embodiments of the server, the digital document is an on-line resource.

In some embodiments of the server, the server is further configured to, during any given one of the plurality of selection-rounds, identify a given combination of originators that is to be provided with access to the any given one of the plurality of selection-rounds. The server configured to identify comprises the server configured to apply combination-selection rules including at least: a limitation rule for limiting a total number of originators in the given combination, and a cycling rule for providing access to different combinations of originators during different selection-rounds from the plurality of selection-rounds.

In some embodiments of the server, to acquire the first bidding data, the server is further configured to acquire a bidding price associated with a given originator from the first combination for a respective message slot on the digital document. The bidding price is indicative of an amount that the given originator proposes to pay for the respective message slot for placement of a respective digital message during the first selection-round. To acquire the first bidding data, the server is further configured to acquire a current reserve price associated with the given originator during the first selection-round. The current reserve price has been determined specifically for the given originator based on a latest estimation of a maximum amount that the given originator is ready to pay for the respective message slot for placement of the respective digital message during any one of the plurality of selection-rounds. To acquire the first bidding data, the server is further configured to compare the bidding price against the current reserve price. The first bidding data is indicative of whether the bidding price of the given originator matches the current reserve price of the given originator.

In some embodiments of the server, in response to the bidding price not matching the current reserve price, the server is further configured to update the current reserve price of the given originator from the first combination of originators, thereby generate an updated reserve price for the given originator.

In some embodiments of the server, to update the current reserve price, the server is configured to determine an adjusted boundary for an adjusted price interval based on (i) a boundary of a price interval and (ii) the first bidding data. The price interval is available to the server and including the current reserve price. The server is thereby configured to determine an adjusted price interval based on the price interval and the first bidding data. The server configured to update comprises the server configured to determine the updated reserve price for the given originator based on the adjusted price interval.

In some embodiments of the server, the adjusted boundary is one of (i) a lower adjusted boundary of the adjusted price interval and (ii) an upper adjusted boundary of the adjusted price interval.

In some embodiments of the server, when the current reserve price is above the bidding price, the adjusted upper boundary of the adjusted price interval is determined based on a difference between the current reserve price and a lower boundary of the price interval, such that adjustment of the upper boundary of the price interval is proportional to the difference.

In some embodiments of the server, the server is further configured to store the updated reserve price in association with the given originator in a storage instead of the current reserve price of the given message originator during the first selection-round. The updated reserve price is to be used as the current reserve price of the given originator during a next selection-round to which the given originator is provided access.

In some embodiments of the server, the given originator is part of the first combination of originators and of the second combination of originators.

In some embodiments of the server, to acquire the second bidding data, the server is configured to acquire an other bidding price associated with the given originator for a respective message slot on the other modifiable portion. The other bidding price is indicative of an amount that the given originator proposes to pay for the respective message slot for placement of a respective digital message during the sequential selection-round. To acquire the second bidding data, the server is configured to acquire the current reserve price associated with the given originator during the sequential selection-round. The current reserve price is the updated reserve price associated with the given originator having been updated in response to the first selection-round. To acquire the second bidding data, the server is configured to compare the other bidding price against the current reserve price. The second bidding data is indicative of whether the other bidding price of the given originator matches the current reserve price of the given message originator.

In some embodiments of the server, the server is further configured to, after the plurality of selection-rounds, determine which originator is associated with a lowest current reserve price amongst the plurality of originators. The originator associated with the lowest current reserve price is a low-yield originator. The server is further configured to, after the plurality of selection-rounds, exclude the low-yield originator from all of a sequential plurality of selection-rounds.

In some embodiments of the server, the server is further configured to, after the plurality of selection-rounds, determine which originator is associated with a highest current reserve price amongst the plurality of originators. The originator associated with the highest current reserve price is a high-yield originator. The server is further configured to, after the plurality of selection-rounds, include the high-yield originator in all of a sequential plurality of selection-rounds.

In some embodiments of the server, the server is further configured to trigger display of the digital document with the modifiable portion on an electronic device associated with a user.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Furthermore, APPENDIX A has been enclosed following the Detailed Description. The APPENDIX A comprises an article providing information regarding at least some aspects of the present technology described herein and/or additional aspects of the present technology. The APPENDIX A and the information forming part thereof have been enclosed for reference purposes and are to be deleted from the application prior to the publication of the application as a patent.

DETAILED DESCRIPTION

Figure 1:
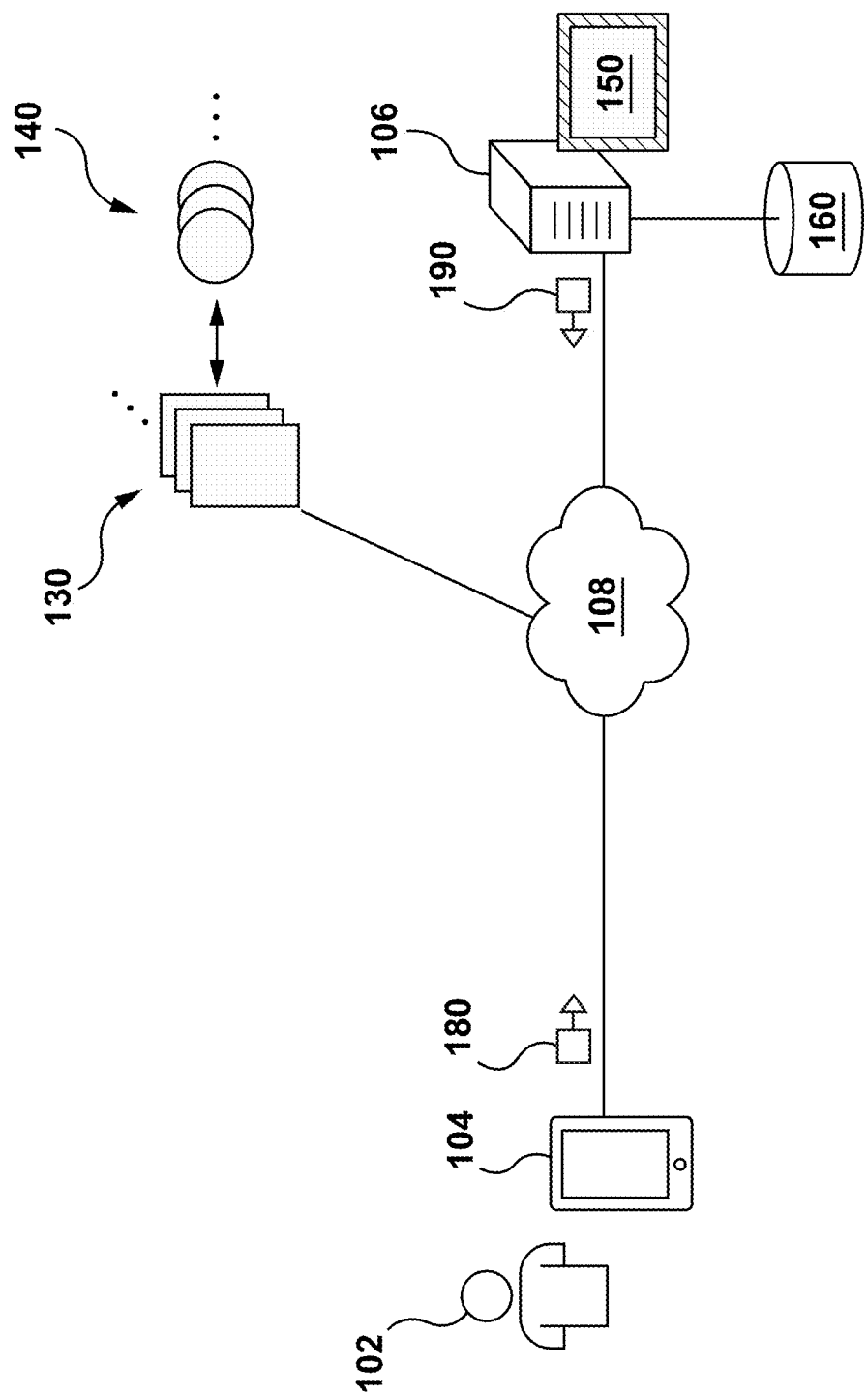
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible.

Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to generate and provide a digital document (e.g., an on-line resource) to an electronic device 104 for display thereof to a user 102. In one non-limiting example, the system 100 may be configured to generate and provide a web page to the electronic device 104 for display thereof to the user 102. In an other non-limiting example, the system 100 may be configured to generate and provide a Search Engine Results Page (SERP) to the electronic device 104 for display thereof to the user 102.

At least some components of the system 100 will now be described, however, it should be understood that other components to those depicted in FIG. 1 may be part of the system 100 without departing from the scope of the present technology.

Electronic Device

The system 100 comprises the electronic device 104, the electronic device 104 being associated with the user 102. As such, the electronic device 104 can sometimes be referred to as a "client device", "end user device", "client electronic device" or simply "device". It should be noted that the fact that the device 104 is associated with the user 102 does not need to suggest or imply any mode of operation—such as a need to log in, a need to be registered, or the like.

The implementation of the device 104 is not particularly limited, but as an example, the device 104 may be implemented as a personal computer (desktops, laptops, netbooks, etc.), a wireless communication device (such as a smartphone, a cell phone, a tablet and the like), as well as network equipment (such as routers, switches, and gateways). The device 104 comprises hardware and/or software and/or firmware (or a combination thereof), as is known in the art, to execute a given browser application. Generally speaking, the purpose of the given browser application is to enable the user 102 to access one or more web resources. How the given browser application is implemented is not particularly limited. One example of the given browser application may be embodied as a Yandex™ browser.

In some embodiments of the present technology, the given browser application implemented by the device 104 may allow the user 102 to enter a URL associated with a desired web page (e.g., on-line resource) and display the desired web page to the user 102.

In other embodiments, however, the given browser application implemented by the device 104 may allow the user 102 to submit search queries to a given search engine (for example, hosted by a server 106) and display SERPs responsive to submitted queries to the user 102.

Generally speaking, the given search engine is a system configured to receive queries from plurality of users, search for information responsive to the received queries and generate SERPs comprising search results that are ranked based on their relevance to the received queries. Some examples of the given search engine may be embodied as a Yandex™ search engine, Google™ search engine, Yahoo™ search engine, and the like.

For example, the user 102 may use the given browser application to input/submit a current query and the electronic device 104 may be configured to generate a query data-packet 180 comprising data indicative of the current query of the user 102. In addition, the electronic device 104 may be configured to acquire a SERP data-packet 190 comprising data indicative of a given SERP generated by the server 106.

Communication Network

The device 104 is communicatively coupled to the communication network 108 for accessing the given search engine of the server 106. In some non-limiting embodiments of the present technology, the communication network 108 can be implemented as the Internet. In other non-limiting embodiments of the present technology, the communication network 108 can be implemented differently, such as any wide-area communication network, local-area communication network, a private communication network and the like. How a communication link (not separately numbered) between the device 104 and the communication network 108 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

The communication network 108 is configured to transmit inter alia the query data-packet 180 from the device 104 to the server 106 and a SERP data-packet 190 from the server 106 to the device 104. For example, the SERP data-packet 190 may comprise data indicative of a given SERP generated by the server 106 and which comprises search results responsive the current query of the user 102. How the server 106 is configured to generate the SERP data-packet 190 and the given SERP will be described in greater detail herein below.

Server

The system 100 also comprises the server 106 that can be implemented as a computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 can be under control and/or management of a search engine provider (not depicted), such as, for example, an operator of the given search engine (e.g., Yandex™ search engine). Hence, as previously mentioned, the server 106 can host the given search engine. As such, the server 106 may be configured to execute one or more information searches responsive to queries submitted by users of the given search engine.

The server 106 is configured to execute a number of computer-implemented procedures for generating a given SERP in response to a query submitted thereto. The server 106 is also configured to generate the SERP data-packet 190, as mentioned above, for providing information indicative of the given SERP to the electronic device 104 for displaying the given SERP to the user 102 via the browser application.

Figure 2:
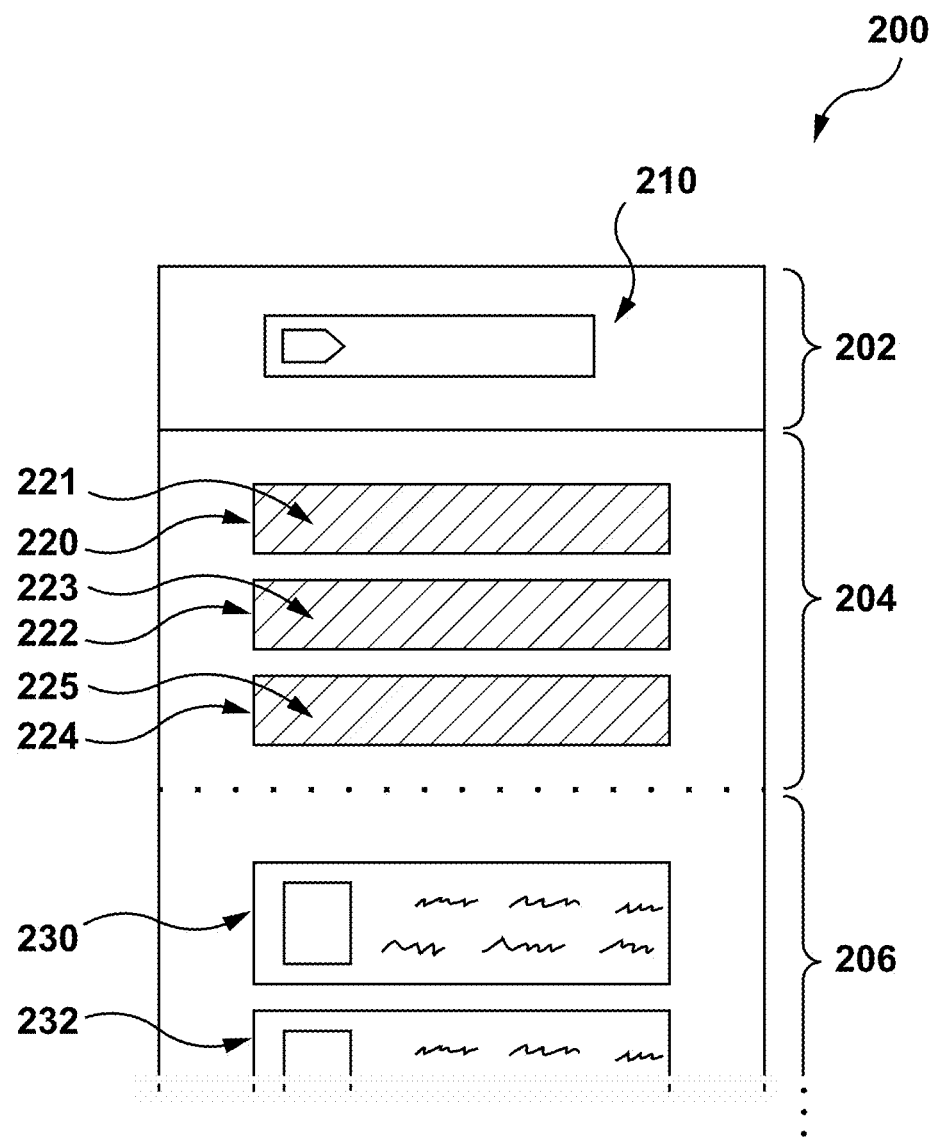
FIG. 2 depicts a representation of a Search Engine Results Page (SERP) that the system of FIG. 1 is configured to generate in accordance with at least some embodiments of the present technology.

With reference to FIG. 2, there is depicted a non-limiting example of a SERP 200 as displayed by the browser application of the electronic device 104 to the user 102. As seen, the SERP 200 generally comprises three portions, namely: (i) a search-bar portion 202, (ii) a modifiable portion 204, and (iii) a search results portion 206.

The search-bar portion 202 includes a search field 210 that displays the query submitted by the user 102 and may allow the user 102 to submit a new query, if so desired. The search results portion 206 comprises a plurality of search results (not numbered) including a first search result 230 and a second search result 232. For example, the server 106 may have identified on-line resources that are relevant to the query submitted by the user 102 and, based on these on-line resources, may have generated the plurality of search results that are displayed on the SERP 200. In this case, it is contemplated that the first search result 230 and the second search result 232 are the two most relevant search results amongst the plurality of search results to the query submitted by the user 102.

The modifiable portion 204 of the SERP 200 comprises a number of message slots, or simply "slots", namely a first message slot 220, a second message slot 222, and a third message slot 224. Each of the three message slots is filled with a respective digital message—that is, a first digital message 221 is placed in the first message slot 220, a second digital message 223 is placed in the second message slot 222, and a third digital message 225 is placed in the third message slot 224. It should be noted that the strategic location of the modifiable portion 204 on the SERP 200— that is, on top of the search results portion 206—results in the user 102 viewing the first digital message 221, the second digital message 223 and the third digital message 225 before viewing the plurality of search results.

In some embodiments, it is contemplated that at least one of the first message slot 220, the second message slot 222, and the third message slot 224 may be left empty—that is, at least one of the three message slots may be an empty message slot without any digital message placed therein.

It is contemplated that in at least some embodiments of the present technology, the modifiable portion 204 may be part of the search results portion 206—that is, the three slots for the first digital message 221, the second digital message 223 and the third digital message 225 may correspond to the top three search result positions in the search results portion 206. In this embodiment, the modifiable portion 204 would still be strategically located on the SERP 200.

It should be noted that the first digital message 221, the second digital message 223 and the third digital message 225 may be provided by originator servers from a plurality of originator servers 130 depicted in FIG. 1. Broadly speaking, the plurality of originator servers 130 may be under control of and/or operated by a plurality of originators 140 that define/determine content of digital messages that are to be placed in slots of the modifiable portion 204. In addition, it should be noted that the plurality of originators 140 may be willing to pay for placement of their respective digital messages into the slots of the modifiable portion 204 due, for example, to the strategic location of the modifiable portion 204 on the SERP 200.

The operator of the server 106 may be desirous of maximizing the profit from placement of digital messages into the slots of the modifiable portion 204. For that reason, in some embodiments of the present technology, the server 106 is configured to host a bidding platform 150, as illustrated in FIG. 1, for that purpose.

Broadly speaking, the bidding platform 150 is represented by a plurality of computer-implemented procedures that the server 106 is configured to perform in order to manage bids of the plurality of originators 140 for placement of their digital messages into slots of the modifiable portion 204. In other words, it can be said that the server 106 hosting the bidding platform 150 is configured to, in a sense, hold an "auction" for slots of the modifiable portion 204 during which a bidding process occurs between the plurality of originators 140 for placement of their digital messages. How the server 106 is configured to manage this bidding process will be described in greater details herein further below.

Database

In FIG. 1, there is also depicted a database 160 communicatively coupled to the server 106 and which is configured to store information extracted, determined and/or generated by the server 106. Generally speaking, the database 160 may receive data from the server 106 which was generated by the server 106 during processing for temporary and/or permanent storage thereof and may provide stored data to the server 106 for use thereof. It is contemplated that the database 160 may be split into several distributed databases, for providing a fault-tolerant storage system for example, without departing from the scope of the present technology.

In one embodiment, the database 160 may be configured to host an "inverted index" that the server 106 may be configured to build and/or maintain. In other words, the database 160 may be configured to store a plurality of posting lists associated with respective searchable terms, as known in the art, for performing efficient searching of relevant information to be provided to the user 102 in response to the query submitted thereby.

Figure 3:
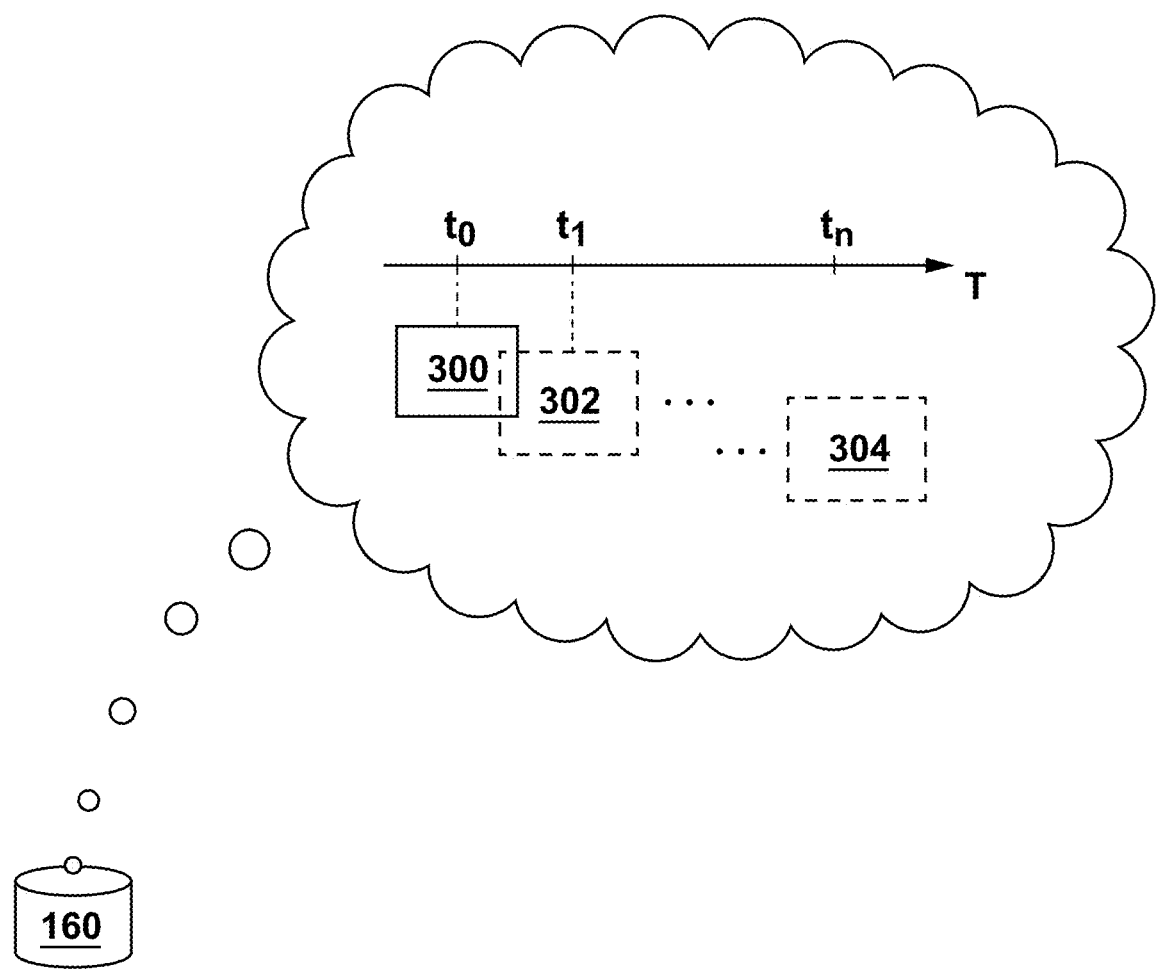
FIG. 3 is a schematic representation of auction data stored by the system of FIG. 1 in accordance with at least some embodiments of the present technology.

With reference to FIG. 3, the database 160 may also be configured to store auction data 300. Broadly speaking, the auction data 300 may be used by the server 106 for supporting the bidding platform 150 or, in order words, for performing the auction for slots of the modifiable portion 204 during which the bidding process occurs for the plurality of originators 140 (for placement of their digital messages).

It should be noted that, as the auction progresses, and more specifically (as it will become apparent from the description below) as different "selection-rounds" of the auction are being performed, the server 106 may be configured to update the then current auction data stored in the database 160 or, put another way, generate updated auction data. As illustrated, (i) at an initial moment in time $t_0$, the database 160 may be storing the auction data 300, (ii) at a first moment in time $t_i$, the database 160 may be storing a first updated auction data 302, and (iii) at a $n^{th}$ moment in time to, the database 160 may be storing a $n^{th}$ updated auction data 304. What information may be included in the auction data 300 and how the server 106 is configured to generate the first updated auction data 302 and the $n^{th}$ updated auction data 304 will be described in greater details herein further below.

Auction Setup

Figure 4:
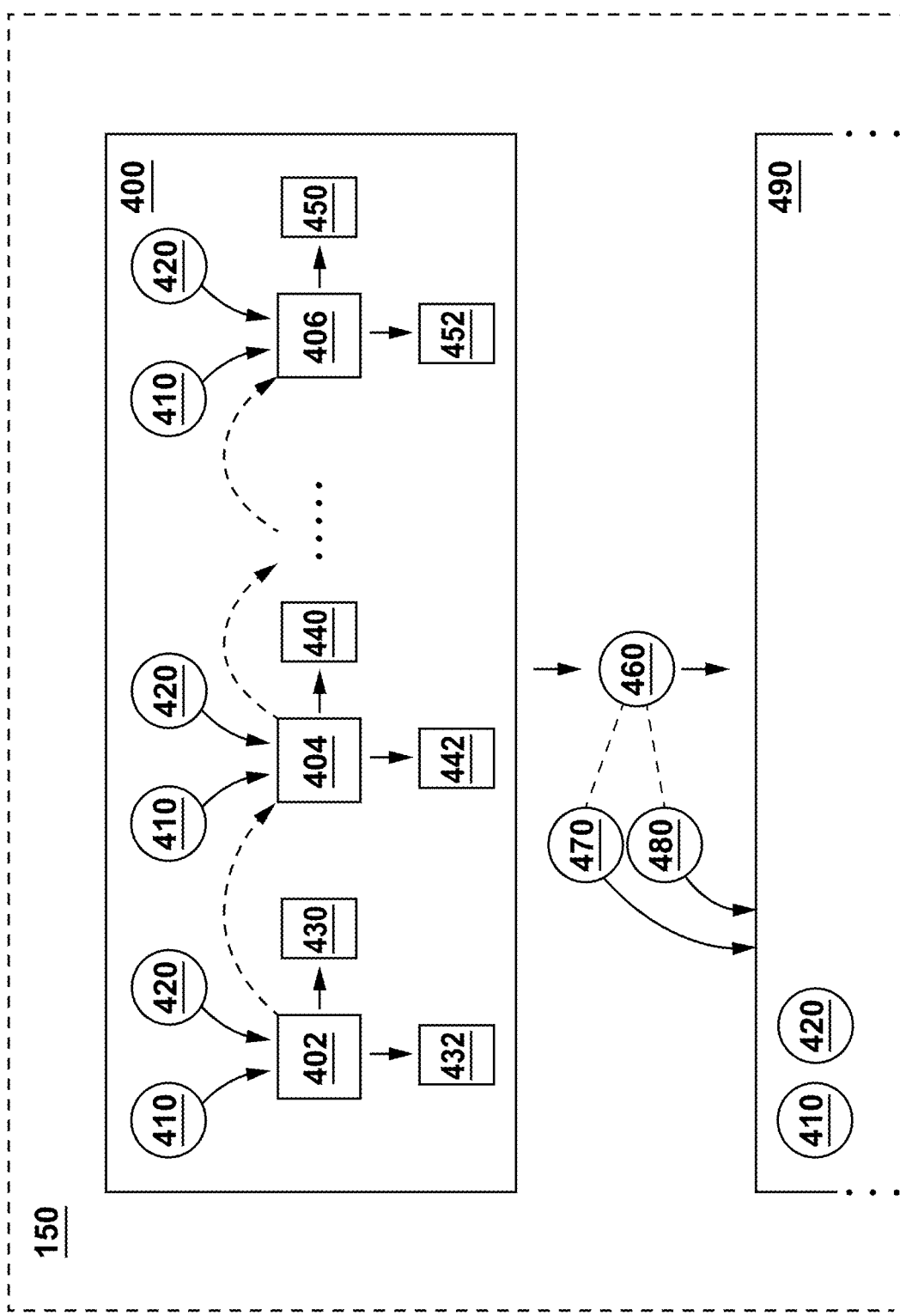
FIG. 4 is a schematic representation of a plurality of selection-rounds that the system of FIG. 1 is configured to perform in accordance with at least some embodiments of the present technology.

With reference to FIG. 4, during a given auction, the server 106 is configured to perform a plurality of selection-rounds 400. It is contemplated that the server 106 may further be configured to perform an other plurality of selection-rounds 490, following the plurality of selection-rounds 400. However, as it will become apparent from the description herein further below, the other plurality of selection-rounds 490 will depend on "outcomes" of the plurality of selection-rounds 400—that is, the other plurality of selection-rounds 490 will depend on the latest updated auction data stored in the database 160 following the plurality of selection-rounds 400. How the plurality of selection-rounds 400 is performed by the server 106 will now be described.

As illustrated in FIG. 4, the plurality of selection-rounds 400 comprises (i) a first selection-round 402, (ii) a second selection-round 404, (iii) other potential selection-rounds (not numbered), and (iv) a $n^{th}$ selection-round 406. It can be said that selection-rounds from the plurality of selection-rounds 400 are sequential. For example, the first selection-round 402 is a previous selection-round in the plurality of selection-rounds 400 to the second selection-round 404, and the $n^{th}$ selection-round 406 is a last selection-round from the plurality of selection-rounds 400.

It is contemplated that a total number of selection-rounds from the plurality of selection-rounds 400 may be pre-determined by the operator of the server 106 in any suitable manner for the given auction. In some embodiments, as it will become apparent form the description herein further below, the total number of selection-rounds from the plurality of selection-rounds 400 may depend on a number of originators of the plurality of originators 140 such that each originator from the plurality of originators 140 has access to at least a minimum number of respective selection-rounds from the plurality of selection-rounds 400.

As illustrated in FIG. 4, during each selection-round from the plurality of selection-rounds 400, the server 106 may be configured to apply two combination-selection rules for the respective selection-rounds, namely a limitation rule 410 and a cycling rule 420. Generally, combination-selection rules are applied for determining which originators are to be provided with access to respective selection-rounds from the plurality of selection-rounds 400. It is contemplated that the limitation rule 410 and the cycling rule 420 may be part of the plurality of computer-implemented procedures that represent the bidding platform 150.

Broadly speaking, the limitation rule 410 may be used by the server 106 for limiting a total number of originators from the plurality of originators 140 (see FIG. 1) that are allowed to bid for message slots during each of the selection-rounds of the plurality of selection-rounds 400.

It should also be noted that each selection-round from the plurality of selection-rounds 400 is associated with a respective number of slots that are available on a given modifiable portion to be bid-for by originators.

For example, let it be assumed that the first selection-round 402 is associated with three (3) slots that are available on a given modifiable portion to be bid-for by originators during the first selection-round 402. In this example, the server 106 may make use of the limitation rule 410 for ensuring that access to the first selection-round 402 is provided to three (3) originators from the plurality of originators 140.

Put another way, it is contemplated that the limitation rule 410 may be used by the server 106 for ensuring that access to the first selection-round is provided to a number of originators from the plurality of originators 140 that is equal to the number of message slots available for the respective selection-round.

As a result of the first selection-round 402 being performed by the server 106, the server 106 may be configured to perform at least two actions, namely a first action 430 and a second action 432.

For example, the first action 430 may be triggering generation of the given modifiable portion with the three (3) message slots thereof including the digital messages of originators that "won" during the first selection-round 402. As it will become apparent from the description herein further below, a given originator may "win" during a given selection-round if the originator's bid is equal and/or above a current "reserve price" that is associated with the given originator at the moment in time when the given selection-round is being performed.

In the same example, the second action 432 may be triggering an update of the auction data 300 in the database 160 (e.g., generate the first updated auction data 302). How the first action 430 and the second action 432 are performed by the server 106 will be described in greater details herein further below.

As mentioned above, in addition to using the limitation rule 410, during each selection-round from the plurality of selection-rounds 400, the server 106 may also make use of the cycling rule 420. Recalling that the limitation rule 410, which is used by the server 106 to limit the number of originators from the plurality of originators 140 that are to bid for message slots during a given selection-round, the cycling rule 420 may be used by the server 106 to limit which combination of originators from the plurality of originators 140 are to bid for message slots during a given selection-round.

Let it be assumed that, during the first selection-round 402, originator A, originator B, and originator C from the plurality of originators 140 have been provided with access to the first selection-round 402 by the server 106 applying the limitation rule 410. Let it also be assumed that, similarly to the first selection-round 402, the second selection-round 404 is also associated with three (3) message slots that are available to be bid-for during the second selection-round 404.

In this case, the server 106 may apply the limitation rule 410 during the second selection-round 404 to ensure that only three (3) originators from the plurality of originators 140 are provided with access to the second selection-round 404 for bidding for respective message slots. However, in addition to the limitation rule 410, the server 106 may also apply the cycling rule 420 during the second selection-round 404 to ensure that a different combination of originators is provided access to the second selection-round 404 than the combination of originators A, B, and C which have been provided with access to the first selection-round 402 (e.g., a previous selection-round).

Hence, it can be said that the cycling rule 420 may be used by the server 106 for, in a sense, "cycling" combinations of originators that are provided with access to respective selection-rounds. For example, in this case, the cycling rule 420 may be used by the server 106 to ensure that the combination of originators that are provided with access to the second selection-round 404 is different from the combination of originators A, B, and C (for example, the server 106 applying the cycling rule 420 may provide access to the second selection-round 404 to the combination of originators A, B, and D).

It is contemplated the cycling rule 420 may be used by the server 106 to ensure that a given combination of originators for a given selection-round is different from an other given combination of originators for a previous selection-round, such that at least one originator in the given combination is different from the other given combination. In some cases, however, the cycling rule 420 may ensure that originators in the given combination and in the other given combination are mutually exclusive (e.g., the given combination and the other given combination do not share any common originator).

Overall, it can be said that during a given selection-round from the plurality of selection-rounds 400, the server 106 may make use of two combination-selection rules for controlling which combinations of originators from the plurality of originators 140 are provided with access to the given selection-round. A first combination-selection rule, i.e. the limitation rule 410, allows the server 106 to ensure that the combination of originators that is provided with access to the given selection-round comprises a number of originators that is equal to the number of message slots available for that given selection-round. A second combination-selection rule, i.e. the cycling rule 420, allows the server 106 to ensure that the combination of originators that is provided with access to the given selection-round comprises a different combination of originators than a previous selection-round to the given selection-round.

It is contemplated that the manner in which the combination-selection rules are applied may be provided by the server 106 to the plurality of originators 140 such that the plurality of originators 140 are, in a sense, "aware" of the rules of the auction.

Returning to the description of FIG. 4, in response to the second selection-round 404 being performed by the server 106, the server 106 may be configured to perform at least two actions, namely a third action 440 and a fourth action 442. Also, in response to the $n^{th}$ selection-round 406 being performed by the server 106, the server 106 may be configured to perform at least two actions, namely a fifth action 450 and a sixth action 452. The third action 440 and the fifth action 450 may be performed similarly to how the server 106 performs the first action 430. The fourth action 442 and the sixth action 452 may be performed similarly to how the server 106 performs the second action 432. How these actions are performed by the server 106 will be described in greater details herein further below.

Once the server 106 has performed the plurality of selection-rounds 400, the server 106 may be configured to analyze a latest auction data stored in the database 160 at that moment in time (e.g., the $n^{th}$ updated auction data 304 in FIG. 3) in order to determine at least one additional combination-selection rule to be used during the other plurality of selection-rounds 490.

For example, after the plurality of selection-rounds 400, the server 106 may be configured to (i) perform an analysis operation 460 on the latest auction data stored in the database 160 at that moment in time, and (ii) based on the analysis operation 460, determine at least one of a default-inclusion rule 470 and a default-exclusion rule 480.

Broadly speaking, the default-inclusion rule 470 may be used by the server 106 to ensure that during each of the other plurality of selection-rounds 490, a particular originator from the plurality of originators 140 is to be included within each combination of originators that are provided access to the other plurality of selection-rounds 490—that is, the default-inclusion rule 470 may be indicative of which originator(s) from the plurality of originators 140 is to be provided with access to each selection-round from the other plurality of selection-rounds 490 by default. As it will become apparent from the description below, in the context of the present description, such originator(s) can be referred to as "high-yield" originator(s).

It is contemplated that the server 106 may be configured to provide (via the default-inclusion rule 470, for example) the high-yield originators with access to a larger number of selection-rounds in the other plurality of selection-rounds 490 than during the plurality of selection-rounds 400.

Broadly speaking, the default-exclusion rule 480 may be used by the server 106 to ensure that during each of the other plurality of selection-rounds 490, an other particular originator from the plurality of originators 140 is to be excluded from each combination of originators that are provided with access to the other plurality of selection-rounds 490—that is, the default-exclusion rule 480 may be indicative of which originator(s) from the plurality of originators 140 is not to be provided with access to any selection-round from the other plurality of selection-rounds 490 by default. As it will become apparent from the description below, in the context of the present description, such originator(s) can be referred to as "low-yield" originator(s).

Again, determination of which originator(s) from the plurality of originators 140 are high-yield originators and which ones are low-yield originators may be performed by the server 106 during the analysis operation 460 and based on the latest auction data stored in the database 160 at that moment in time (e.g., the nth updated auction data 304). How the server 106 is configured to perform the analysis operation 460 will be described in greater details herein further below.

First Selection-Round

Figure 5:
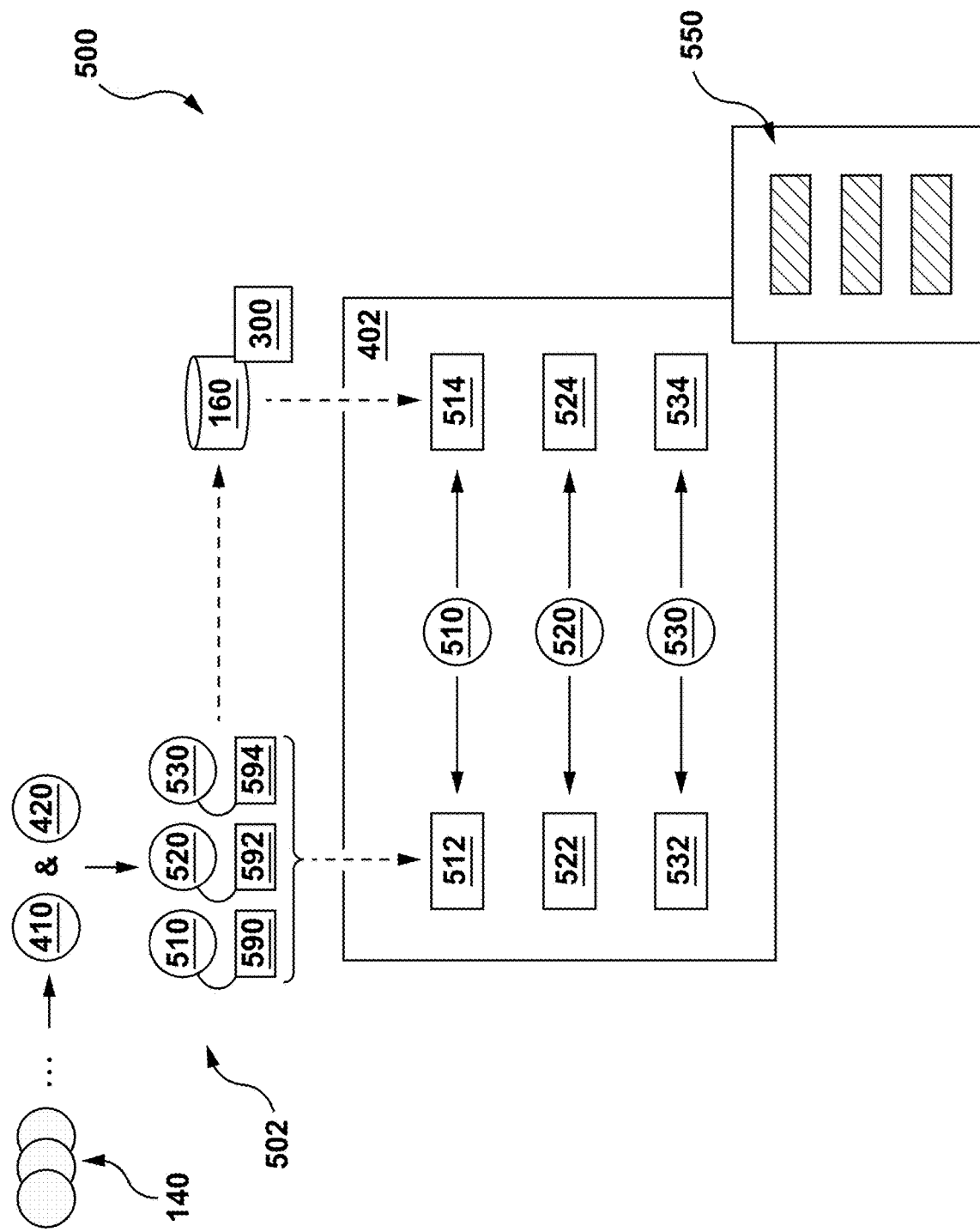
FIG. 5 is a schematic representation of the bidding process occurring during a first one of the plurality of selection-rounds of FIG. 4 in accordance with at least some embodiments of the present technology.

With reference to FIG. 5, there is depicted a schematic illustration of a bidding process 500 occurring during the first selection-round 402. The first selection-round 402 will now be described in greater details.

As mentioned above, the first selection-round 402 is associated with a number of message slots that are available on a given modifiable portion to be bid-for. As illustrated, the first selection-round 402 is associated with a plurality of message slots 550 including three (3) message slots.

Also as mentioned above, the server 106 is configured to apply the limitation rule 410 and the cycling rule 420 for determining how many and which combination of originators from the plurality of originators 140 are to be provided with access to the first selection-round 402. It is contemplated that, if the first selection-round 402 is an initial selection-round of the auction, the server 106 may omit applying the cycling rule 420 since there would not have been any previous selection-rounds.

Recalling that the limitation rule 410 is used to ensure that a number of originators to be provided with access to a given round is equal to the number of message slots available for the given selection-round, the server 106 may be configured to provide access to a first combination 502 of originators from the plurality of originators 140 which includes three (3) originators, namely a first originator 510, a second originator 520, and a third originator 530. Again, assuming that the first selection-round 402 is the initial selection-round of the auction, the cycling rule 420 may allow any combination of three (3) originators since would not have been any previous selection-rounds.

In some embodiments, the server 106 providing access to the first combination 502 may refer to the server 106 allowing the originators form the first combination 502 to bid for placement of respective digital messages in the plurality of message slots 550. For example, (i) the first originator 510 may be allowed to bid for placement of a first digital message 590 into a given one of the plurality of message slots 550, (ii) the second originator 520 may be allowed to bid for placement of a second digital message 592 into an other given one of the plurality of message slots 550, and (iii) the third originator 530 may be allowed to bid for placement of a third digital message 594 into the other one of the plurality of message slots 550.

As it will become apparent from the description herein further below, provision of access by the server 106 may be implemented in a different manner. For example, the server 106 may provide access by "artificially" increasing reserve prices of originators that are not part of the first combination 502 such that when they bid during the first selection-round 402, they cannot win during the first selection-round 402 because their bids will not be equal or above the respective artificially increased reserve prices.

On the one hand, during the bidding process 500, the first combination 502 of originators may provide the server 106 with respective bidding prices. For example, the first originator 510 may provide a first bidding price 512, the second originator 520 may provide a second bidding price 514, and the third originator 530 may provide a third bidding price 532. It should be noted that a given bidding price is indicative of an amount that a respective originator proposes to pay for the respective message slot for placement of a respective digital message during a given selection-round.

It goes without saying that originators may use various bidding strategies in order to pay as little as possible for placement of respective digital messages into respective message slots. Hence, it is contemplated that a given bidding price provided by a given one the first combination 502 of originators may not be the respective maximum amount that the given originator is ready to pay for a respective message slot for placement of a respective digital message. Indeed, in most cases, the bidding price provided by a given one the first combination 502 of originators will be lower that the respective maximum amount that the given originator is ready to pay.

On the other hand, during the bidding process 500, information indicative of the first combination 502 is used by the server 106 in order to retrieve data from the database 160, the data being associated with the respective ones of the first combination 502 of originators. For example, if the first selection-round 402 is performed at the initial moment in time to (see FIG. 3), the server 106 may access the auction data 300 in order to retrieve auction data associated with the respective ones of the first combination 502 of originators at the initial moment in time to.

It is contemplated that the server 106 may be configured to retrieve data indicative of a current reserve price associated with each respective one of the first combination 502 of originators. For example, at the initial moment in time to (assuming that the first selection-round is performed at this initial moment in time) the server 106 may be configured to retrieve data from the database 160 which is indicative of a current reserve price 514 for the first originator 510, a current reserve price 524 for the second originator 520, and a current reserve price 534 for the third originator 530.

It should be noted that a given current reserve price is currently stored in the database 160 and has been determined specifically for the respective originator based on a latest estimation of the maximum amount that the respective originator is ready to pay for the respective message slot for placement of the respective digital message during any selection-round. If the first selection-round 402 is the initial selection-round of the auction, for example, the current reserve price 514 may be pre-determined by the operator of the server 106 specifically for the first originator 510 (the same goes for the current reserve price 524 and the current reserve price 534). How the current reserve price 514 used during the first selection-round 402 is determined will be described in greater details herein further below with reference to FIG. 8.

As it will become apparent from the description herein further below, during subsequent selection-rounds, the current reserve prices for at least some of the plurality of originators 140 may be updated based on a latest estimation of the maximum amount that the respective originator is ready to pay for the respective message slot. As such, in at least some embodiments of the present technology, the developers of the present technology have devised methods and servers for iteratively updating the individual reserve prices of respective ones of the plurality of originators 140 such that the most current reserve price for a given originator stored in the database 160 is a latest estimation of the actual maximum amount that the given originator is ready to pay for the respective message slot. How the current reserve price 514 used during the first selection-round 402 is updated will be described in greater detail herein further below with reference to FIG. 8.

Now that the server 106 acquired (i) the first bidding price 512 and the then current reserve price 514 for the first originator 510, (ii) the second bidding price 522 and the then current reserve price 524 for the second originator 520, and (iii) the third bidding price 532 and the then current reserve price 534 for the third originator 530, during the first selection-round 402, the server 106 may be configured to compare the bidding prices and the current reserve prices of respective ones of the first combination 502 of originators. In other words, during the first selection-round 402, the server 106 may be configured to:

compare (i) the first bidding price 512 against (ii) the then current reserve price 514 of the first originator 510;

compare (i) the second bidding price 522 against (ii) the then current reserve price 524 of the second originator 520; and compare (i) the third bidding price 532 against (ii) the then current reserve price 534 of the third originator 530.

The server 106 may be configured to determine whether a given bidding price matches a respective current reserve price. Determining whether the given bidding price matches the respective current reserve price may refer to the server 106 being configured to determine whether the given bidding price is above, below, or equal to the respective current reserve price. Determining whether the given bidding price matches the respective current reserve price may also refer to the server 106 being configured to determine whether the given bidding price is higher and/or lower relative to the respective current reserve price.

For example, if the first bidding price 512 is above the current reserve price 514 of the first originator 510, the server 106 may be configured to assign the first digital message 590 of the first originator 510 to a given one of the plurality of message slots 550. Hence it can be said that the bid of the first originator 510 during the first selection-round 402 is accepted (e.g., the first originator 510 won during the first selection-round 402) since the first originator 510 proposes to pay more than the then current reserve price 514 for the first originator 510.

In the same example, if the second bidding price 522 is below the then current reserve price 524 of the second originator 520, the server 106 may be configured to not assign the second digital message 592 of the second originator 520 to any one of the plurality of message slots 550. Hence it can be said that the bid of the second originator 520 during the first selection-round 402 is rejected (e.g., the second originator 520 lost during the first selection-round 402) since the second originator 520 proposes to pay less than the then current reserve price 524 for the second originator 520.

In the same example, if the third bidding price 532 is equal the then current reserve price 534 of the third originator 530, the server 106 may be configured to assign the third digital message 594 of the third originator 530 to a given one of the plurality of message slots 550. Hence it can be said that the bid of the third originator 530 during the first selection-round 402 is accepted (e.g., the third originator 530 won during the first selection-round 402) since the third originator 530 proposes to pay a same amount as the then current reserve price 534 for the third originator 530.

In some embodiments, it is contemplated that during a given selection-round, allocation of respective message slots may depend on bidding prices of originators that "won" during the given selection-round. In this example, the first originator 510 and the third originator 530 can be considered as originators that won during the first selection-round 402. However, since the first bidding price 512 is above the third bidding price 532, the first digital message 590 may be allocated with a message slot that is above an other message slot amongst the plurality of message slots 550 with which the third digital message 594 of the third originator 530 is allocated.

Figure 9:
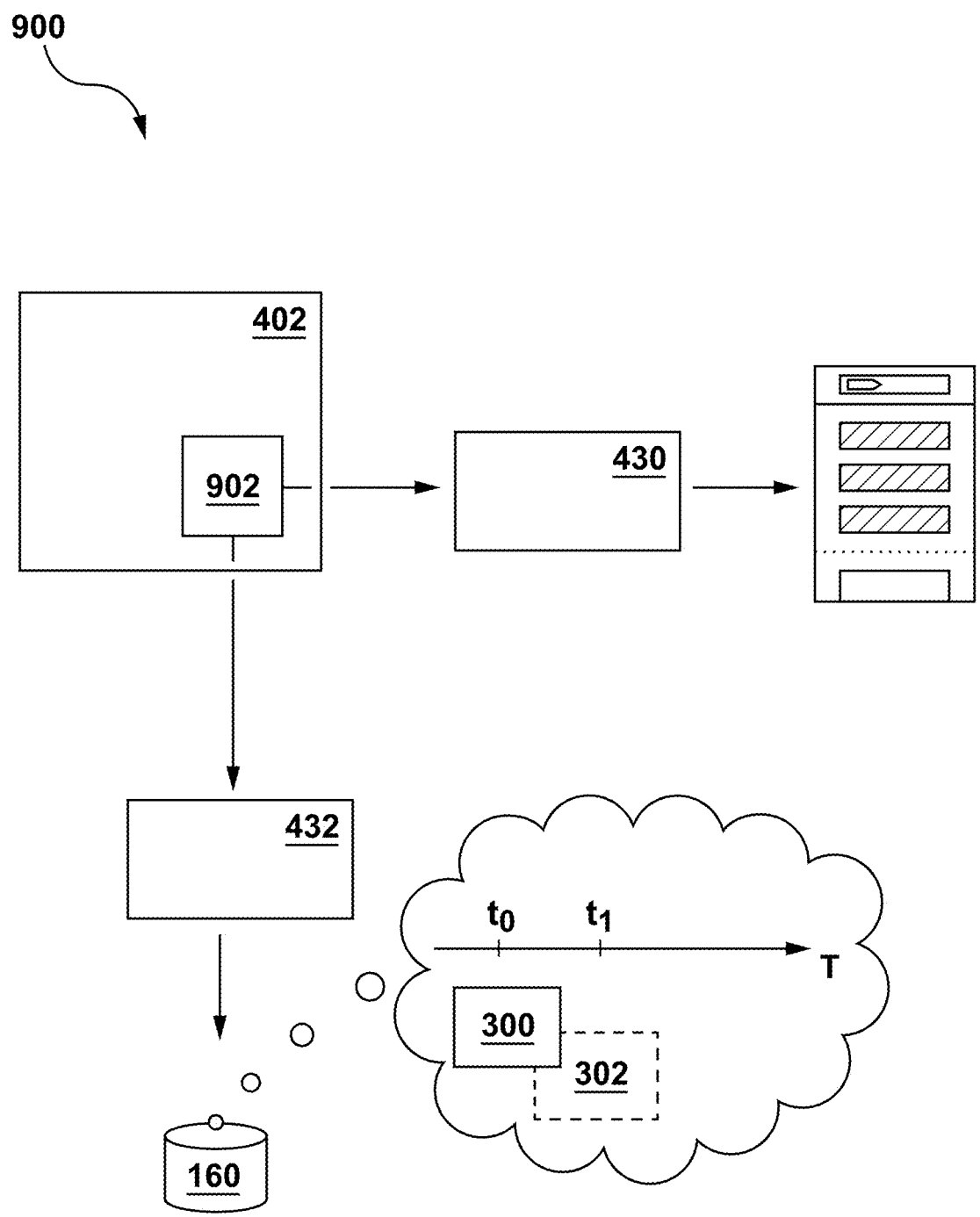
FIG. 9 is a schematic illustration of various actions that the system of FIG. 1 may perform as a result of the first selection-round in accordance with at least some embodiments of the present technology.

Overall, during the bidding process 500 of the first selection-round 402, the server 106 may be configured to acquire first "bidding data" 902, depicted in FIG. 9, associated with the first combination 502 of originators that bid for message slots during the first selection-round 402. The first bidding data 902 may comprise:

(i) the respective bidding prices from the first combination 502 of originators (e.g., the first bidding price 512, the second bidding price 522, and the third bidding price 532);
(ii) the respective then current reserve prices for the first combination 502 of originators from the database 160 (e.g., the then current reserve prices 514, 524, and 534); and
(iii) other data indicative of whether the respective bidding price matches the respective then current reserve price of a given originator from the first combination 502 of originators.

Also depicted in FIG. 9 is a schematic representation 900 of the first action 430 and the second action 432 that the server 106 may be configured to perform based on the first bidding data 902.

In one embodiment, in response to acquiring the first bidding data 902, the server 106 may be configured to perform the first action 430 such as, for example, triggering placement of digital messages of at least some of the first combination 502 of originators in the plurality of message slots 550 of a given modifiable portion.

Taking the above example, where the bids of the first originator 510 and of the third originator 530 are accepted and where the bid of the second originator 520 is rejected, the server 106 performing the first action 430 may be configured to trigger placement of the first digital message 590 and of the third digital message 594 into respective message slots in the plurality of message slots 550, while not placing the second digital message 592 into any one of the plurality of message slots 550. As a result, the server 106 may be configured to generate a SERP similar to the SERP 200 having the modifiable portion 204 with (i) a first message slot filled with the first digital message 590, (ii) a second message slot filled with the third digital message 594, and (iii) a third message slot being empty (since the bid of the second originator 520 of the first combination 502 is rejected, as explained above).

It should be noted that the order of assignment of digital messages to message slots may correspond to an order in which the bidding prices of the winning originators are ranked—that is, the winning originator with a highest bidding price amongst the winning originators may be assigned with a top message slot amongst the available message slots for a given selection-round.

In an other embodiment, in response to acquiring the first bidding data 902, the server 106 may be configured to perform the second action 432 such as, for example, triggering an update of the auction data 300 in the database 160 (e.g., generate the first updated auction data 302).

As mentioned above, at the initial moment time to, the database 160 stores the auction data 300. Also, assuming that the then current reserve prices 514, 524 and 534 for the first combination 502 of originators is acquired by the server 106 form the database 160 at the initial moment in time to, the current reserve prices 514, 524 and 534 are acquired from the auction data 300 stored in the database 160 at that moment in time. Now, once the first bidding data 902 is acquired by the server 106, the server 106 may perform the second action 432 for (i) determining updated reserve prices for the first combination 502 of originators based on the first bidding data 902, and (ii) store the updated reserve prices of the first combination 502 of originators in the database 160 instead of (or in addition to) the then current reserve prices 514, 524 and 534. As such, the updated reserve prices of the first combination 502 of originators become the current reserve prices after the said update, instead of the reserve prices 514, 524 and 534 (which are no longer current reserve prices after the said update). Therefore, by storing the updated reserve prices (the new current reserve prices) of the first combination 502 of originators instead of (or in addition to) the reserve prices 514, 524 and 534 in the database 160 (the old reserve prices), the server 106 is configured to update the auction data 300 or, in other words, store the first updated auction data 302.

As mentioned above, how the server 106 is configured to (i) determine the updated reserve prices for the first combination 502 of originators based on the first bidding data 902, and (ii) store the updated reserve prices of the first combination 502 of originators in the database 160 instead of the current reserve prices 514, 524 and 534 (thereby storing the first updated auction data 302) will be described in greater details herein further below with reference to FIG. 8.

Second Selection-Round

Figure 6:
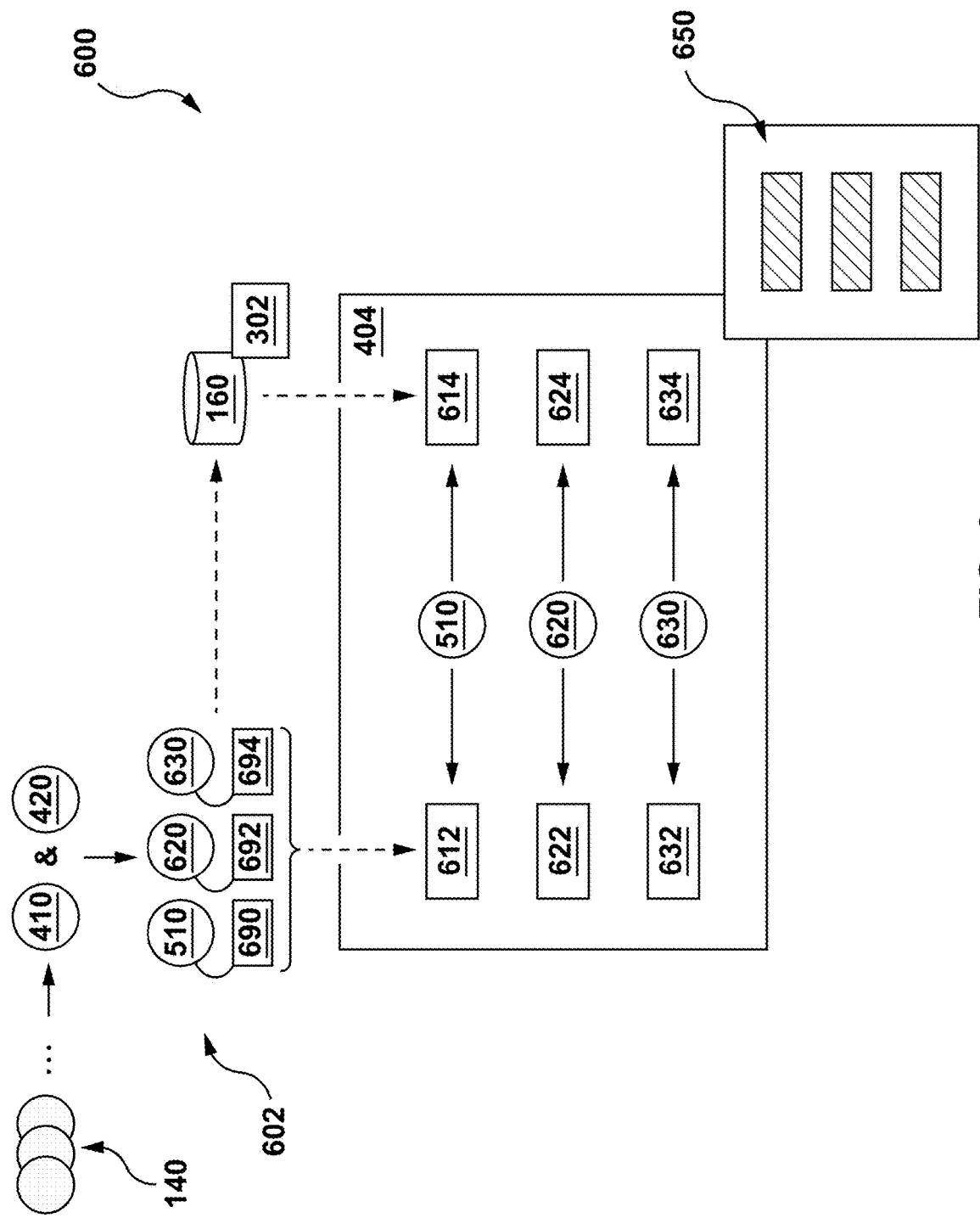
FIG. 6 is a schematic representation of the bidding process occurring during a second one of the plurality of selection-rounds of FIG. 4 in accordance with at least some embodiments of the present technology.

With reference to FIG. 6, there is depicted a bidding process 600 occurring during the second selection-round 404. The second selection-round 404 will now be described in greater details.

As mentioned above, the second selection-round 404 is associated with a number of message slots that are available on a given modifiable portion to be bid-for. As illustrated, the second selection-round 404 is associated with a plurality of message slots 650 including three (3) message slots.

Also as mentioned above, the server 106 is configured to apply the limitation rule 410 and the cycling rule 420 for determining how many and which combination of originators from the plurality of originators 140 are to be provided access to the second selection-round 404.

Recalling that the limitation rule 410 is used to ensure that a number of originators to be provided with access to a given round is equal to the number of message slots available for the given selection-round, the server 106 may be configured to provide access to a second combination 602 of originators from the plurality of originators 140 which includes three (3) originators.

Recalling that the cycling rule 420 is used to ensure that different combinations of originators are to be provided with access to different selection-rounds, the server 106 may be configured to provide access to the second combination 602 of originators such that the second combination 602 is different from the first combination 502—that is, at least one originator of the second combination 602 is different from originators in the first combination 502. Indeed, as illustrated, although the first originator 510 is also part of the second combination 602, the two other originators in the second combination 602, namely a fourth originator 620, and a fifth originator 630, are different from originators from the first combination 502. Hence, in this example, this first originator 510 is a common originator to both the first selection-round 402 (in the first combination 502) and to the second selection-round 404 (in the second combination 602).

In some embodiments, the server 106 providing access to the second combination 602 may refer to the server 106 allowing the originators form the second combination 602 to bid for placement of respective digital messages in the plurality of message slots 650. In other embodiments, however, as mentioned above the server 106 providing access to the second combination 602 may refer to the server 106 comparing bidding prices of other originators against "artificially" increased reserve prices such that only the second combination 602 of originators stands a chance at providing bidding prices that are above their respective then current reserve prices.

For example, (i) the first originator 510 may be allowed to bid for placement of an other first digital message 690 (or the first digital message 590, for example) into a given one of the plurality of message slots 650, (ii) the fourth originator 620 may be allowed to bid for placement of a fourth digital message 692 into an other given one of the plurality of message slots 650, and (iii) the fifth originator 630 may be allowed to bid for placement of a fifth digital message 694 into the other one of the plurality of message slots 650.

Similarly to what has been described above with respect to the bidding process 500, during the bidding process 600, the first originator 510 may provide an other first bidding price 612, the fourth originator 620 may provide a fourth bidding price 622, and the fifth originator 630 may provide a fifth bidding price 632.

Again, similarly to what has been described above with respect to the bidding process 500, during the bidding process 600, information indicative of the second combination 602 is used by the server 106 in order to retrieve data from the database 160 which is associated with the respective ones of the second combination 602 of originators. In this case, since the second selection-round 404 is performed at the first moment in time ti which is after the initial moment in time to (see FIG. 3), the server 106 may access the first updated auction data 302 (as opposed to auction data 300) in order to retrieve latest auction data associated with the respective ones of the second combination 602 of originators at the first moment in time ti.

It is contemplated that the server 106 may be configured to retrieve data indicative of the then current reserve price associated with each respective one of the second combination 602 of originators. For example, the server 106 may be configured to retrieve data indicative of a then current reserve price 624 for the fourth originator 620, and a then current reserve price 634 for the fifth originator 630.

However, it should be noted that for the first originator 510, the server 106 may be configured to retrieve data indicative of a then current reserve price 614 (instead of the old reserve price 514), since following the first selection-round 402 as explained above, the then current reserve price 514 has been updated. In other words, the server 106 may be configured to retrieve data indicative of the then current reserve price 614 during the second selection-round 404, where the then current reserve price 614 is the updated reserve price of the first originator 510.

As previously allude to, since the first originator 510 participated in a previous selection-round to the second selection-round 404, its "initial" current reserve price 514 has been updated to the reserve price 614, and hence, during the second selection-round 404 the reserve price 614 is used as the then current reserve price for the first originator 510.

Now that the server 106 acquired (i) the other first bidding price 612 and the then current reserve price 614 for the first originator 510, (ii) the fourth bidding price 622 and the then current reserve price 624 for the fourth originator 620, and (iii) the fifth bidding price 632 and the then current reserve price 634 for the fifth originator 630, during the second selection-round 404, the server 106 may be configured to compare the bidding prices and the then current reserve prices of respective ones of the second combination 602 of originators, similarly to how the server 106 compared the bidding prices and the then current reserve prices of respective ones of the first combination 502 of originators during the first selection-round 402.

Overall, during the bidding process 600 of the second selection-round 404, the server 106 may be configured to acquire second bidding data (not numbered) associated with the second combination 602 of originators that bid for message slots during the second selection-round 404. The second bidding data may comprise:
 (i) the respective bidding prices from the second combination 602 of originators (e.g., the other first bidding price 612, the fourth bidding price 622, and the fifth bidding price 632);
 (ii) the respective current reserve prices for the second combination 602 of originators from the database 160 (e.g., the then current reserve prices 614, 624, and 634, and where the then current reserve price 614 is an updated reserve price for the first originator 510 following the first selection-round 402); and
 (iii) other data indicative of whether the respective bidding price matches the respective then current reserve price of a given originator from the second combination 602 of originators.

Updated Auction Data after Plurality of Selection-Rounds

Figure 7:
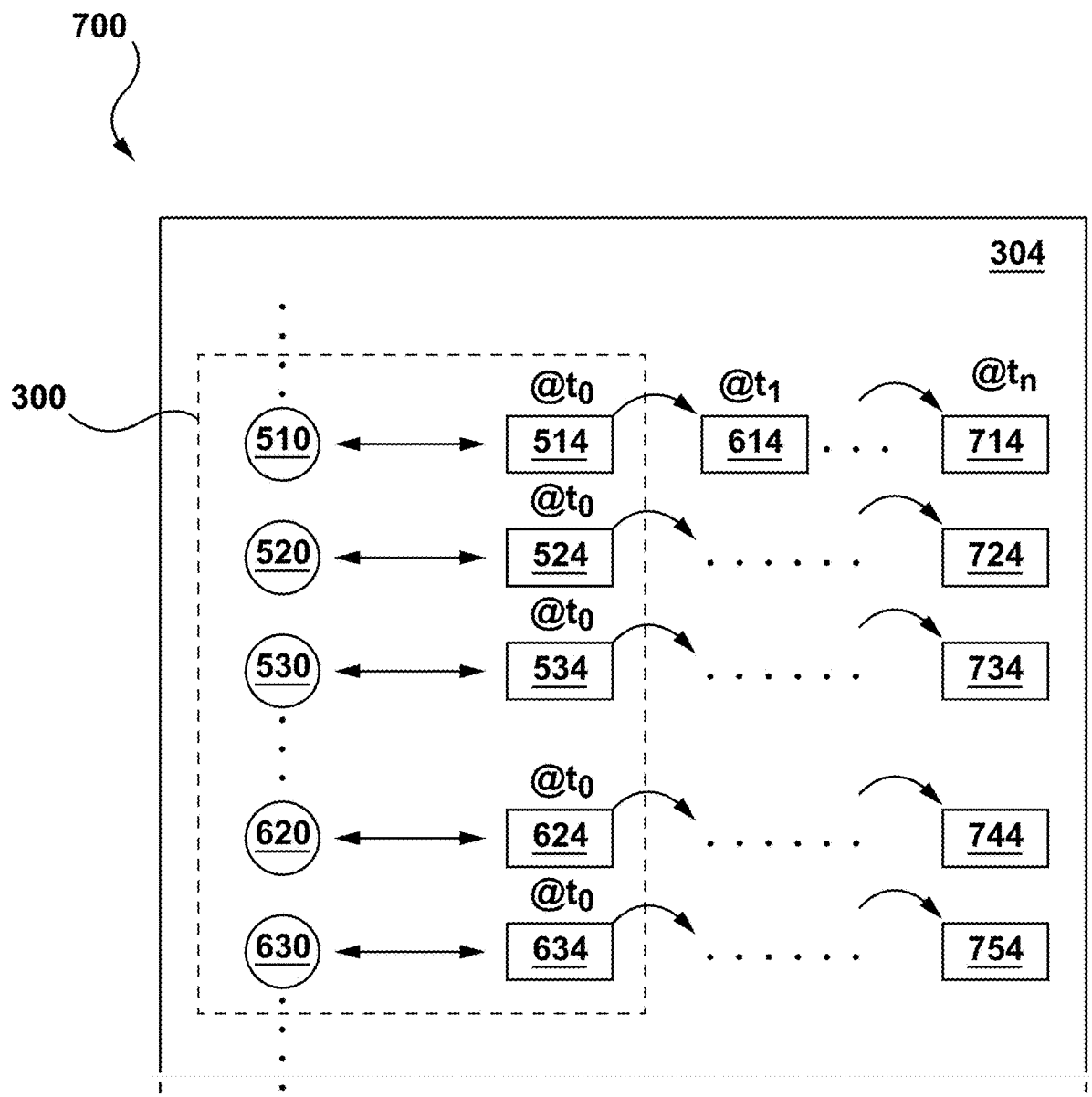
FIG. 7 is a schematic representation of updated auction data stored by the system of FIG. 1 following the plurality of selection-rounds of FIG. 4 in accordance with at least some embodiments of the present technology.

With reference to FIG. 7, there is depicted a schematic representation 700 of the nth updated auction data 304 stored in the database 160 following the plurality of selection-rounds 400.

As it can be seen in FIG. 7, the auction data 300 comprises information indicative of at least some of the plurality of originators 140 in associated with the current reserve prices at to. For example, before the first selection-round 402, the auction data 300 comprises data indicative of:

The first originator 510 being associated with the (then) current reserve price 514 of the first originator 510;

The second originator 520 being associated with the (then) current reserve price 524 of the second originator 520;

The third originator 530 being associated with the (then) current reserve price 534 of the third originator 530;

The fourth originator 620 being associated with the (then) current reserve price 624 of the fourth originator 620;

The fifth originator 630 being associated with the (then) current reserve price 634 of the fifth originator 630; and so forth.

However, as selection-rounds from the plurality of selection-rounds 400 are being performed as described above, the server 106 stores data indicative of association between the plurality of originators 140 and respective updated reserve prices. For example, after the first selection-round 402, the first originator 510 may be associated with the (then) current reserve price 614, which is the updated reserve price determined by the server 106 following the first selection-round 402.

It should be noted that in some cases, the database 160 may be configured to store a historical data indicative of how reserve prices have been updated for each of the plurality of originators 140 with each selection-round. For example, instead of storing solely a latest reserve price in association with a given originator, the server 106 may be configured to store in the database 160 all updated iterations of the reserve prices for the given originator.

Returning to the description of FIG. 7, after the plurality of selection-rounds 400 are performed by the server 106, the database 160 may be configured to store:

a latest reserve price 714 for the first originator 510;
a latest reserve price 724 for the second originator 520;
a latest reserve price 734 for the third originator 530;
a latest reserve price 744 for the fourth originator 620;
a latest reserve price 754 for the fifth originator 630; and
so forth.

As previously alluded to, the server 106 may be configured to perform the analysis operation 460 based on the latest auction data (including the latest reserve prices) in order to determine which originators from the plurality of originators 140 are high-yield originators, and which are low-yield originators. However, prior to describing how the analysis operation 460 is performed, how the reserve prices for respective originators from the plurality of originators are determined and how they are updated will be described first.

Updating Reserve Prices

Figure 8:
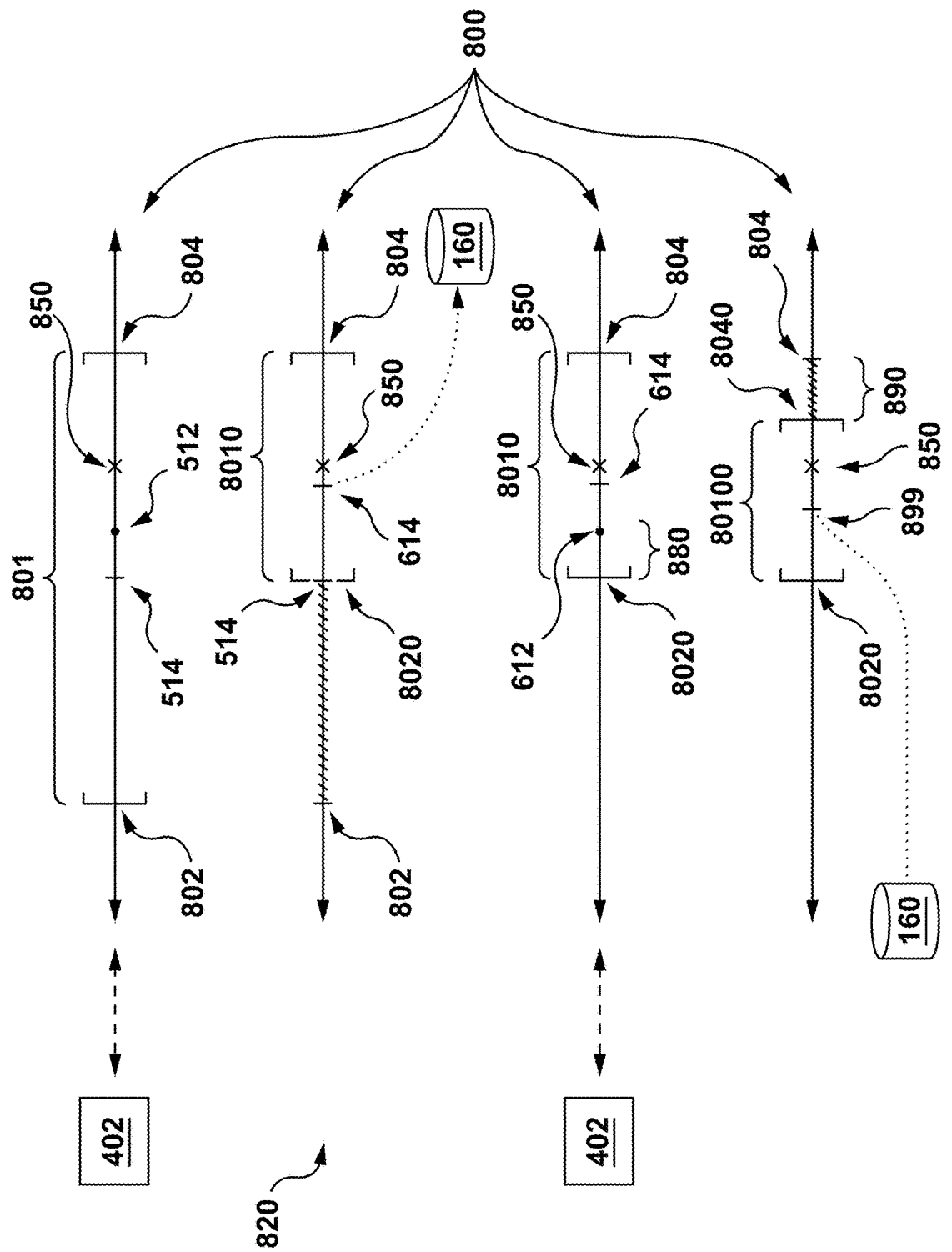
FIG. 8 is a schematic representation of a process of updating reserve prices of a given originator of the system of FIG. 1 during the first selection-round and the second selection-round in accordance with at least some embodiments of the present technology.

With reference to FIG. 8, there is depicted a schematic illustration 820 representing the updating process of reserve prices for the first originator 510. In FIG. 8, there are depicted four instances of a price axis 800 for illustrating how the updating process of reserve prices for the first originator 510 is performed.

On the price axis 800, there is depicted a maximum price 850 representing the actual maximum amount that the first originator 510 is ready to pay for placing a digital message into a given message slot. As mentioned above, the maximum price 850 is apriori unknown, and hence, is illustrated on FIG. 8 for ease of illustration only.

At the initial moment in time to, the database 160 may be storing a price interval 801 in association with the first originator 510 (as part of the auction data 300), and which is defined between a lower boundary 802 and an upper boundary 804. It is contemplated that the lower boundary 802 and the upper boundary 804 may be pre-determined by the operator of the server 106.

As previously mentioned above, the current reserve price 514 may be pre-determined by the operator of the server 106 specifically for the first originator 510. For example, the current reserve price 514 at to may be pre-determined based on the interval 801 such as being located at a midpoint of the interval 801 (as illustrated).

As mentioned above, during the first selection-round 402, the server 106 acquires the first bidding price 512 from the first originator 510. The server 106 is then configured to compare the first bidding price 512 to the then current reserve price 514. Recalling that the first bidding price 512 is above the then current reserve price 514, the server 106 may be configured to place the first digital message 590 of the first originator into a given one of the plurality of message slots 550. In such a case, the server 106 may be configured to adjust the lower boundary 802 of the price interval 801.

In some embodiments, the server 106 may adjust the lower boundary 802 so that an adjusted lower boundary 8020 matches the then current reserve price 514. The logic is as follows, since the first originator 510 is ready to pay the first bidding price 512, then the maximum price 850 is above the then current reserve price 514.

As a result, by determining the adjusted lower boundary 8020, the server 106 may be configured to determine an adjusted price interval 8010 for the first originator 510. In some embodiments, the server 106 may be configured to update the then current reserve price 514 based on the adjusted price interval 8010. For example, the server 106 may be configured to determine the updated reserve price 614 as corresponding to a midpoint of the adjusted price interval 8010. The adjusted price interval 8010 and the updated reserve price 614 may be stored by the server 106 in the database 160 as part of the first updated auction data 302.

As mentioned above, the updated reserve price 614 is used by the server 106 during a next selection-round to which the first originator 510 has access as the then current reserve price. For example, the updated reserve price 614 is used by the server 106 during the second selection-round 404 as the then current reserve price 614.

As mentioned above, during the second selection-round 404, the server 106 acquires the other first bidding price 612 from the first originator 510. In this example as illustrated, let it be assumed that the other first bidding price 612 from the first originator 510 is below the then current reserve price 614. In such a case, the server 106 may be configured to adjust the upper boundary 804 of the adjusted price interval 8010.

It should be noted that in at least some embodiments of the present technology, adjustments of upper boundaries of price intervals and lower boundaries of price intervals are non-symmetrical, or in other words, the adjustments of upper boundaries can be performed by the server 106 in accordance with a different logic than the logic used to perform the adjustments of lower boundaries.

In some embodiments, in order to adjust the upper boundary 804, the server 106 may be configured to determine a difference 880 between the other first bidding price 612 (which is below the then current reserve price 614) and the adjusted lower boundary 8020. Once the server 106 determines the difference 880, the server 106 may adjust the upper boundary 804 by a difference 890 that is, in at least some embodiments, proportional to the difference 880. The server 106 may thus be configured to so-determine an adjusted upper boundary 8040, and as a result, the server 106 may be configured to determine a re-adjusted price interval 80100.

The server 106 may be configured to determine an other updated reserve price 899 for the first originator to be used during the next selection-round after the second selection-round 404 to which the first originator 510 is provided access. For example, the other updated reserve price 899 may be determined as corresponding to a midpoint of the re-adjusted price interval 80100. As such, during the next selection-round after the second selection-round 404 to which the first originator 510 is provided access, the other updated reserve price 899 may be used as the then current reserve price for the first originator 510.

It should be noted that updated reserve prices of the first originator 510 in such an iterative manner allows to reduce breadth of a price interval that includes the maximum price 850. As such, after adjusting a number of times the price interval 801 in such a manner, the latest reserve price 714 for the first originator 510 will be close to the maximum price 850 that is apriori unknown. In other words, the latest reserve price 712 will be a "good" estimation of the maximum price 850 for the first originator 510.

In some embodiments of the present technology, developers of the present technology have developed at least some aspects of the present technology which are described in greater detail in the article entitled "Strategic Regret Minimization in Repeated Position Auctions", which as mentioned above is appended herewith.

Analysis Operation

As mentioned above, after performing the plurality of selection-rounds 400, the server 106 stores and has access to the latest current reserve prices for the plurality of originators 140. In some embodiments, the server 106 may be configured to perform the analysis operation 460 based on the latest current reserve prices of the plurality of originators 140.

As part of the analysis operation 460, the server 106 may be configured to rank the plurality of originators 140 based on respective latest current reserve prices. In some embodiments, the server 106 may be configured to split a ranked list of the plurality of originators 140 into different categories. For example, the server 106 may be configured to split the ranked list of the plurality of originators 140 into three (3) categories, namely (i) high-yield originators including originators associated with the highest latest current reserve prices, (ii) low-yield originators including originators associated with the lowest latest current reserve prices, and (iii) other originators including originators that are ranked in between the high-yield originators and the low-yield originators.

It should be noted that since the latest reserve prices are "good" estimations of the maximum amount that respective originators are ready to pay for placement, ranking the plurality of originators 140 based on the respective latest reserve prices results in the originators having the higher estimated maximum amounts that they are ready to pay (e.g., high-yield originators) to be on the top of the ranked list and in the originators having the lowest estimated maximum amounts that they are ready to pay (e.g., low-yield originators) to be on the bottom of the ranked list.

Once the high-yield originators and/or the low-yield originators are identified, the server 106 may be configured to determine the default-inclusion rule 470 and/or the default-exclusion rule 480 to be used during the other plurality of selection-rounds 490 (see FIG. 4). For example, the default-inclusion rule 470 may be used by the server 106 for including by default the high-yield originators in each selection-round from the other plurality of selection-rounds 490. In another example, the default-inclusion rule 470 may be used by the server 106 for excluding by default the low-yield originators in each selection-round from the other plurality of selection-rounds 490. Hence, employing the default-inclusion rule 470 and/or the default-exclusion rule 480 during the other plurality of selection-rounds 490 may allow the operator of the server 106 to increase monetization based on bids performed during the other plurality of selection-rounds 490.

Computer-Implemented Method

Figure 10:
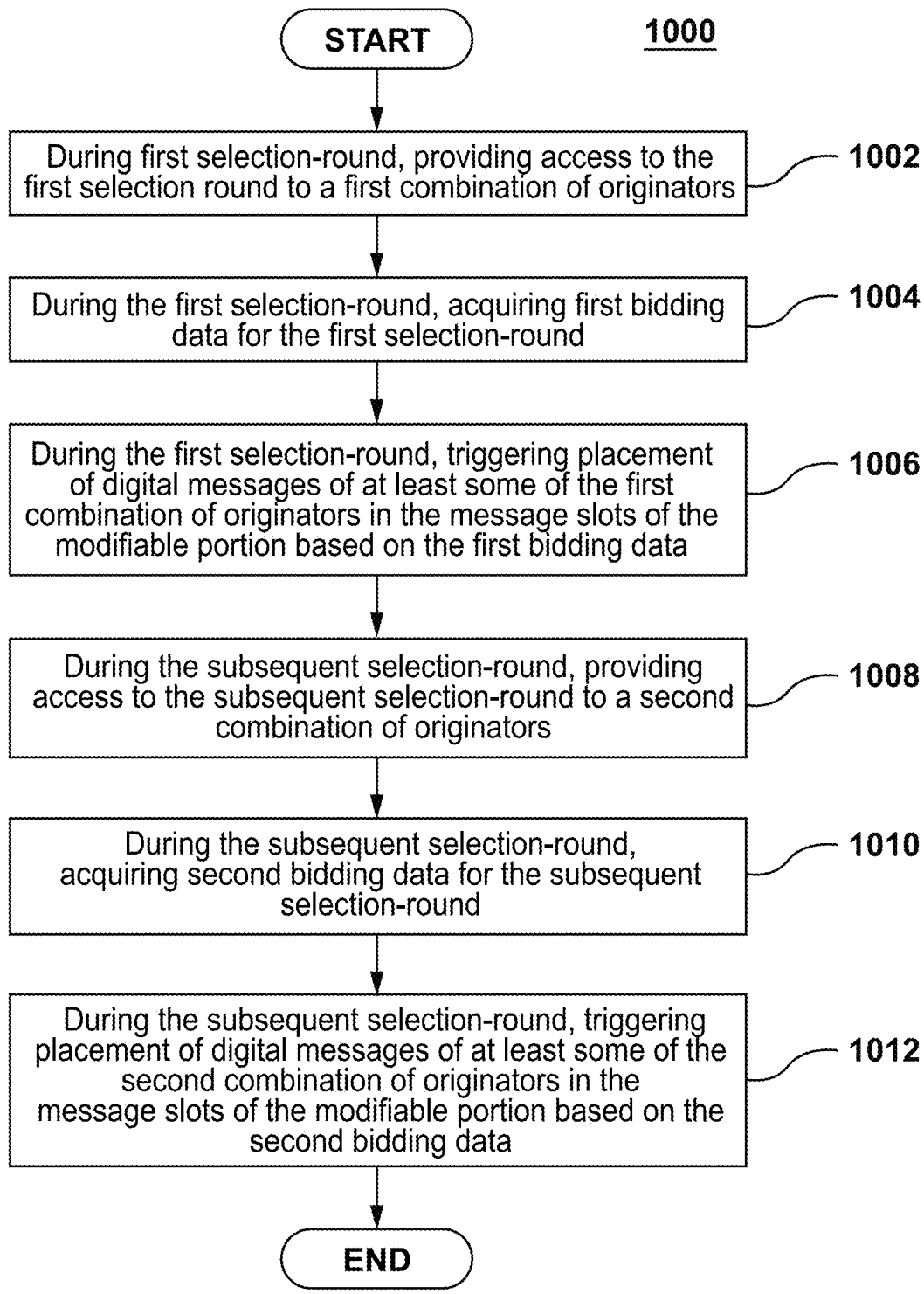
FIG. 10 is a schematic block diagram of a flow chart of a method for generating a modifiable portion of a digital document in accordance with non-limiting embodiments of the present technology.

With reference to FIG. 10, there is depicted a schematic block diagram illustration of a flow chart of a method 1000 of generating a given modifiable portion of a given digital document. It should be noted that the given modifiable portion has message slots for placement of digital messages and where the digital messages are to be provided by a given plurality of originators. It should also be noted that the generation of the given modifiable portion is to be performed during a given first selection-round of a given plurality of selection-rounds, and each selection-round being associated with a respective number of message slots that are available on the modifiable portion to be bid-for by originators having access to the respective selection-round.

The method 1000 of generation the given modifiable portion is executable by the server 106. Various steps of the method 1000 will now be described in greater detail.

Step 1002: During First Selection-Round, Providing Access to the First Selection-Round to a First Combination of Originators The method 1000 begins at step 1002 with the server 106, during the first selection round 402, providing access to the first selection-round 402 to the first combination 502 of originators.

In some embodiments, the server 106 providing access to the first combination 502 may refer to the server 106 allowing the originators form the first combination 502 to bid for placement of respective digital messages in the plurality of message slots 550. For example, (i) the first originator 510 may be allowed to bid for placement of the first digital message 590 into the given one of the plurality of message slots 550, (ii) the second originator 520 may be allowed to bid for placement of the second digital message 592 into the other given one of the plurality of message slots 550, and (iii) the third originator 530 may be allowed to bid for placement of the third digital message 594 into the other one of the plurality of message slots 550.

In other embodiments, however, the server 106 providing access to the first combination 502 may refer to the server 106 comparing bidding prices of other originators against "artificially" increased reserve prices such that only the first combination 502 of originators stands a chance at providing bidding prices that are above their respective then current reserve prices.

It should be noted that the first combination 502 includes a number of originators that is equal to the number of message slots available for the first selection-round 402. By providing access to the first combination 502, the server 106 limits the number of originators from the plurality of originators 140 that are to bid for message slots during the first selection-round 402.

Step 1004: During the First Selection-Round, Acquiring First Bidding Data for the First Selection-Round The method 100 continues to step 1004 with the server 106 being configure to acquire the first bidding data 902 (see FIG. 9) for the first selection-round 402. The first bidding data 902 is associated with the first combination 502 of originators that bid for message slots during the first selection-round 402.

For example, the first bidding data 902 may comprise:
  (i) the respective bidding prices from the first combination 502 of originators (e.g., the first bidding price 512, the second bidding price 522, and the third bidding price 532);
  (ii) the respective then current reserve prices for the first combination 502 of originators from the database 160 (e.g., the then current reserve prices 514, 524, and 534); and
  (iii) other data indicative of whether the respective bidding price matches the respective then current reserve price of a given originator from the first combination 502 of originators.

It is contemplated that during the step 1004, the server 106 may be configured to (i) acquire a given bidding price associated with a given originator from the first combination 502, (ii) acquire a then current reserve price associated with the given originator, and (iii) compare the given bidding price against the then current reserve price of the given originator.

Step 1006: During the First Selection-Round, Triggering Placement of Digital Messages of at Least Some of the First Combination of Originators in the Message Slots of the Modifiable Portion Based on the First Bidding Data The method 1000 continues to step 1006 with the server 106 being configured to, during the first selection-round 402, trigger placement of digital messages of at least some of the first combination 502 of originators in the message slots of a given modifiable portion based on the first bidding data 902.

In one embodiment, in response to acquiring the first bidding data 902, the server 106 may be configured to perform the first action 430 (see FIG. 4) such as, for example, triggering placement of digital messages of at least some of the first combination 502 of originators in the plurality of message slots 550 of a given modifiable portion.

Taking the example presented herein, where the bids of the first originator 510 and of the third originator 530 are accepted and where the bid of the second originator 520 is rejected (this information being available from the first bidding data 902), the server 106 performing the first action 430 may be configured to trigger placement of the first digital message 590 and of the third digital message 594 into respective message slots in the plurality of message slots 550, while not placing the second digital message 592 into any one of the plurality of message slots 550. As a result, the server 106 may be configured to generate a SERP similar to the SERP 200 having the modifiable portion 204 with (i) a first message slot filled with the first digital message 590, (ii) a second message slot filled with the third digital message 594, and (iii) a third message slot being empty (since the bid of the second originator 520 of the first combination 502 is rejected, as explained above).

In some embodiments, in response to a given bidding price not matching the then current reserve price of a given originator, the server 106 may be configured to update the current reserve price of the given originator, and thereby generate an updated reserve price for the given originator. The server 106 may also be configured to store the updated reserve price in association with the given originator in a given (the database 160, for example) instead of the current reserve price of the given message originator—this updated reserve price is for being used by the server 106 as the current reserve price of the given originator during a next selection-round to which the given originator is provided access.

Step 1008: During the Subsequent Selection-Round, Providing Access to the Subsequent Selection-Round to a Second Combination of Originators The method 1000 continues to step 1008 with the server 106 being configured to, during a subsequent selection round (e.g., the second selection-round 404), providing access to the subsequent selection-round 404 to the second combination 602 of originators.

As mentioned above, with reference to FIG. 6, the second selection-round 404 is associated with a number of message slots that are available on a given modifiable portion to be bid-for. As illustrated, the second selection-round 404 is associated with a plurality of message slots 650 including three (3) message slots.

Also as mentioned above, the server 106 is configured to apply the limitation rule 410 and the cycling rule 420 for determining how many and which combination of originators from the plurality of originators 140 are to be provided access to the second selection-round 404.

Recalling that the limitation rule 410 is used to ensure that a number of originators to be provided with access to a given round is equal to the number of message slots available for the given selection-round, the server 106 may be configured to provide access to a second combination 602 of originators from the plurality of originators 140 which includes three (3) originators.

Recalling that the cycling rule 420 is used to ensure that different combinations of originators are to be provided with access to different selection-rounds, the server 106 may be configured to provide access to the second combination 602 of originators such that the second combination 602 is different from the first combination 502—that is, at least one originator of the second combination 602 is different from originators in the first combination 502. Indeed, as illustrated, although the first originator 510 is also part of the second combination 602, the two other originators in the second combination 602, namely a fourth originator 620, and a fifth originator 630, are different from originators from the first combination 502. Hence, in this example, this first originator 510 is a common originator to both the first selection-round 402 (in the first combination 502) and to the second selection-round 404 (in the second combination 602).

In some embodiments, the server 106 providing access to the second combination 602 may refer to the server 106 allowing the originators form the second combination 602 to bid for placement of respective digital messages in the plurality of message slots 650. In other embodiments, however, as mentioned above the server 106 providing access to the second combination 602 may refer to the server 106 comparing bidding prices of other originators against "artificially" increased reserve prices such that only the second combination 602 of originators stands a chance at providing bidding prices that are above their respective then current reserve prices.

For example, (i) the first originator 510 may be allowed to bid for placement of an other first digital message 690 (or the first digital message 590, for example) into a given one of the plurality of message slots 650, (ii) the fourth originator 620 may be allowed to bid for placement of a fourth digital message 692 into an other given one of the plurality of message slots 650, and (iii) the fifth originator 630 may be allowed to bid for placement of a fifth digital message 694 into the other one of the plurality of message slots 650.

Step 1010: During the Subsequent Selection-Round, Acquiring Second Bidding Data for the Subsequent Selection-Round The server 106 continues to step 1010 with the server 106 being configured to acquire the second bidding data (not numbered). For example, during the bidding process 600 of the second selection-round 404, the server 106 may be configured to acquire second bidding data associated with the second combination 602 of originators that bid for message slots during the second selection-round 404. This second bidding data may comprise:
- (iv) the respective bidding prices from the second combination 602 of originators (e.g., the other first bidding price 612, the fourth bidding price 622, and the fifth bidding price 632);
- (v) the respective current reserve prices for the second combination 602 of originators from the database 160 (e.g., the then current reserve prices 614, 624, and 634, and where the then current reserve price 614 is an updated reserve price for the first originator 510 following the first selection-round 402); and
- (vi) other data indicative of whether the respective bidding price matches the respective then current reserve price of a given originator from the second combination 602 of originators.

Step 1012: During the Subsequent Selection-Round, Triggering Placement of Digital Messages of at Least Some of the Second Combination of Originators in the Message Slots of the Modifiable Portion Based on the Second Bidding Data The method 1000 continues to step 1012 with the server 106 being configured to, during the subsequent selection-round (e.g., the second selection-round 404), trigger placement of digital messages of at least some of the second combination of originators in message slots of a given modifiable portion based on the second bidding data.

In some embodiments, it is contemplated that trigger placement of digital messages of at least some of the second combination of originators in message slots of a given modifiable portion based on the second bidding data may be performed by the server 106 in a similar manner to how the server 106 is configured to trigger placement of digital messages of at least some of the first combination 502 of originators in the message slots of a given modifiable portion based on the first bidding data 902 during the first selection-round 402.

In some embodiments of the present technology, after performing the plurality of selection-rounds 400, the server 106 may be configured to determine which originator from the plurality of originators 140 is associated with that a lowest then current reserve price amongst the plurality of originators 140—that is, the server 106 may be configured to identify such originator as a given low-yield originator. The server 106 may also be configured to exclude the given low-yield originator from all of a sequential plurality of selection-rounds (e.g., the other plurality of selection-rounds 490).

In other embodiments of the present technology, after performing the plurality of selection-rounds 400, the server 106 may be configured to determine which originator from the plurality of originators 140 is associated with that a highest then current reserve price amongst the plurality of originators 140—that is, the server 106 may be configured to identify such originator as a given high-yield originator. The server 106 may also be configured to include the given high-yield originator in all of a sequential plurality of selection-rounds (e.g., the other plurality of selection-rounds 490).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of generating a digital document having a modifiable portion, the modifiable portion having a plurality of message slots for placement of digital messages, the digital messages being provided by a plurality of originators,
the generating being performed during a first selection-round of a plurality of selection-rounds,
each selection-round being associated with a respective number of message slots that are available on the modifiable portion to be bid-for by originators having access to the respective selection-round,
the method being executable by a server, the method comprising:
during the first selection-round from the plurality of selection-rounds:
providing, by the server, access to the first selection-round to a first combination of originators by artificially increasing reserve prices for originators other than the first combination of originators,
the first combination including a number of originators that is equal to the number of message slots available for the first selection-round,
thereby limiting, by the server, the number of originators from the plurality of originators that are to bid for message slots during the first selection-round,
acquiring, by the server, first bidding data for the first selection-round,
the first bidding data being associated with the first combination of originators that bid for message slots during the first selection-round, and
triggering, by the server, placement of a first set of winning digital messages of at least some of the first combination of originators in the plurality of message slots of the modifiable portion based on the first bidding data; during a subsequent selection-round from the plurality of selection-rounds:
providing, by the server, access to the subsequent selection-round to a second combination of originators by artificially increasing reserve prices for originators other than the second combination of originators,
the second combination being different from the first combination,
the second combination including a number of originators that is equal to the number of message slots available for the subsequent selection-round,
thereby limiting, by the server, (i) the number of originators from the plurality of originators that are to bid for message slots during the subsequent selection-round, and (ii) which combination of originators are to bid for message slots during the subsequent selection-round,
acquiring, by the server, second bidding data for the subsequent selection-round,
the second bidding data being associated with the second combination of originators that bid for message slots during the subsequent selection-round, and
triggering, by the server, placement of a second set of winning digital messages of at least some of the second combination of originators in the plurality of message slots of the modifiable portion based on the second bidding data;

determining that all bids were rejected for a message slot of the plurality of message slots; and generating, by the server, the digital document including:
  the first set of winning digital messages in the plurality of message slots that were filled by the first selection-round,
  the second set of winning digital messages in the plurality of message slots that were filled by the second selection-round, and
  an empty message slot corresponding to the message slot where all bids were rejected.

2. The method of claim 1, wherein the digital document is a Search Engine Result Page (SERP) to be generated by the server.

3. The method of claim 1, wherein the digital document is an on-line resource.

4. The method of claim 1, wherein the method comprises: during any given one of the plurality of selection-rounds,
  identifying, by the server, a given combination of originators that is to be provided with access to the any given one of the plurality of selection-rounds,
    the identifying comprises applying, by the server, combination-selection rules including at least:
      (i) a limitation rule for limiting a total number of originators in the given combination, and
      (ii) a cycling rule for providing access to different combinations of originators during different selection-rounds from the plurality of selection-rounds.

5. The method of claim 1, wherein the acquiring the first bidding data comprises:
  acquiring, by the server, a bidding price associated with a given originator from the first combination for a respective message slot on the digital document,
    the bidding price being indicative of an amount that the given originator proposes to pay for the respective message slot for placement of a respective digital message during the first selection-round;
  acquiring, by the server, a current reserve price associated with the given originator during the first selection-round,
    the current reserve price having been determined specifically for the given originator based on a latest estimation of a maximum amount that the given originator is ready to pay for the respective message slot for placement of the respective digital message during any one of the plurality of selection-rounds; and
  comparing, by the server, the bidding price against the current reserve price, the first bidding data being indicative of whether the bidding price of the given originator matches the current reserve price of the given originator.

6. The method of claim 5, wherein in response to the bidding price not matching the current reserve price, the method further comprises:
  updating, by the server, the current reserve price of the given originator from the first combination of originators,
    thereby generating, by the server, an updated reserve price for the given originator.

7. The method of claim 6, wherein the updating comprises:
  determining, by the server, an adjusted boundary for an adjusted price interval based on (i) a boundary of a price interval and (ii) the first bidding data,
    the price interval being available to the server and including the current reserve price,
      thereby determining an adjusted price interval based on the price interval and the first bidding data; and
  determining, by the server, the updated reserve price for the given originator based on the adjusted price interval.

8. The method of claim 7, wherein the adjusted boundary is one of (i) a lower adjusted boundary of the adjusted price interval and (ii) an upper adjusted boundary of the adjusted price interval.

9. The method of claim 8, wherein when the current reserve price is above the bidding price, the adjusted upper boundary of the adjusted price interval is determined based on a difference between the current reserve price and a lower boundary of the price interval,
  such that adjustment of the upper boundary of the price interval is proportional to the difference.

10. The method of claim 6, wherein the method further comprises:
  storing, by the server, the updated reserve price in association with the given originator in a storage instead of the current reserve price of the given message originator during the first selection-round,
    the updated reserve price to be used as the current reserve price of the given originator during a next selection-round to which the given originator is provided access.

11. The method of claim 6, wherein the given originator is part of the first combination of originators and of the second combination of originators.

12. The method of claim 11, wherein the acquiring the second bidding data comprises:
  acquiring, by the server, another bidding price associated with the given originator for a respective message slot on the other modifiable portion,
    the other bidding price being indicative of an amount that the given originator proposes to pay for the respective message slot for placement of a respective digital message during the sequential selection-round;
  acquiring, by the server, the current reserve price associated with the given originator during the sequential selection-round,
    the current reserve price being the updated reserve price associated with the given originator having been updated in response to the first selection-round;
  comparing, by the server, the other bidding price against the current reserve price, the second bidding data being indicative of whether the other bidding price of the given originator matches the current reserve price of the given message originator.

13. The method of claim 5, wherein the method further comprises:
  after the plurality of selection-rounds:
    determining, by the server, which originator is associated with a lowest current reserve price amongst the plurality of originators,
      the originator associated with the lowest current reserve price being a low-yield originator;
    excluding, by the server, the low-yield originator from all of a sequential plurality of selection-rounds.

14. The method of claim 5, wherein the method further comprises:
- after the plurality of selection-rounds:
  - determining, by the server, which originator is associated with a highest current reserve price amongst the plurality of originators,
    - the originator associated with the highest current reserve price being a high-yield originator;
  - including, by the server, the high-yield originator in all of a sequential plurality of selection-rounds.

15. The method of claim 1, wherein the method further comprises:
- triggering, by the server, display of the digital document with the modifiable portion on an electronic device associated with a user.

16. A server comprising at least one processor and memory comprising executable instructions for generating a digital document having a modifiable portion, the modifiable portion having a plurality of message slots for placement of digital messages, the digital messages being provided by a plurality of originators,
- the generating being performed during a first selection-round of a plurality of selection-rounds,
  - each selection-round being associated with a respective number of message slots that are available on the modifiable portion to be bid-for by originators having access to the respective selection-round,
- the executable instructions, when executed by the at least one processor, causing the server to:
- during the first selection-round from the plurality of selection-rounds:
  - provide access to the first selection-round to a first combination of originators by artificially increasing reserve prices for originators other than the first combination of originators,
    - the first combination including a number of originators that is equal to the number of message slots available for the first selection-round,
      - thereby limiting the number of originators from the plurality of originators that are to bid for message slots during the first selection-round,
- acquire first bidding data for the first selection-round,
  - the first bidding data being associated with the first combination of
  - originators that bid for message slots during the first selection-round, and trigger placement of a first set of winning digital messages of at least some of the first combination of originators in the plurality of message slots of the modifiable portion based on the first bidding data;
- during a subsequent selection-round from the plurality of selection-rounds:
  - provide access to the subsequent selection-round to a second combination of originators by artificially increasing reserve prices for originators other than the second combination of originators,
    - the second combination being different from the first combination,
      - the second combination including a number of originators that is equal to the number of message slots available for the subsequent selection-round,
        - thereby limiting (i) the number of originators from the plurality of originators that are to bid for message slots during the subsequent selection-round, and (ii) which combination of originators are to bid for message slots during the subsequent selection-round,
- acquire second bidding data for the subsequent selection-round,
  - the second bidding data being associated with the second combination of originators that bid for message slots during the subsequent selection-round, and
- trigger placement of a second set of winning digital messages of at least some of the second combination of originators in the plurality of message slots of the modifiable portion based on the second bidding data;
- determine that all bids were rejected for a message slot of the plurality of message slots; and
- generate, by the server, the digital document including:
  - the first set of winning digital messages in the plurality of message slots that were filled by the first selection-round,
  - the second set of winning digital messages in the plurality of message slots that were filled by the second selection-round, and
  - an empty message slot corresponding to the message slot where all bids were rejected.

17. The server of claim 16, wherein the digital document is a Search Engine Result Page (SERP) to be generated by the server.

* * * * *